US012336064B2

(12) United States Patent
(10) Patent No.: US 12,336,064 B2
(45) Date of Patent: Jun. 17, 2025

Sacek et al.

(54) MODULAR CONSTRUCTION SYSTEM LIGHT MATRIX

(71) Applicant: LEGO A/S, Billund (DK)

(72) Inventors: Arthur Sacek, Billund (DK); Ole Terp, Billund (DK); Jonathan Ørnstrup, Billund (DK); Sebastian Hjort, Billund (DK); Jacob Thomsen Juhl, Billund (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 18/552,010

(22) PCT Filed: Mar. 24, 2022

(86) PCT No.: PCT/EP2022/057723

§ 371 (c)(1),
(2) Date: Sep. 22, 2023

(87) PCT Pub. No.: WO2022/200479

PCT Pub. Date: Sep. 29, 2022

(65) Prior Publication Data

US 2024/0163983 A1 May 16, 2024

(30) Foreign Application Priority Data

Mar. 25, 2021 (DK) ............................ PA202170132

(51) Int. Cl.
*F21V 3/04* (2018.01)
*F21V 7/05* (2006.01)
(Continued)

(52) U.S. Cl.
CPC ............ *H05B 33/12* (2013.01); *F21V 3/049* (2013.01); *F21V 7/05* (2013.01); *F21V 11/06* (2013.01);
(Continued)

(58) Field of Classification Search
CPC . F21V 3/049; H05B 33/12; G09F 9/33; G09F 9/302
See application file for complete search history.

(56) References Cited

U.S. PATENT DOCUMENTS 4,254,453 A * 3/1981 Mouyard ................ G09F 13/22
345/82
8,573,805 B2 * 11/2013 Leung .................. F21V 17/002
362/249.02
(Continued)

FOREIGN PATENT DOCUMENTS

CN 107734746 A 2/2018
KR 1020180001022 A 1/2018
(Continued)

OTHER PUBLICATIONS

International Search Report and Written Opinion corresponding to Application No. PCT/EP2022/057723, dated Jul. 19, 2022, 11 pages.
(Continued)

*Primary Examiner* — Zheng Song
(74) *Attorney, Agent, or Firm* — Day Pitney LLP; George Chaclas; Anthony A. Kassas

(57) ABSTRACT

A modular construction system light matrix comprising a housing having side walls, an end wall and a front edge encircling a front opening of said housing. The light matrix has an array of light emitting elements. The light matrix has a compartment grid, arranged in said housing and having compartment grid walls extending towards said front opening of the housing, one compartment for each light emitting element. The light matrix has a light diffusing element arranged at said opening of the housing having a plurality of diffuser tiles, each diffuser tile covering a compartment of the compartment grid. The diffusing element comprises a diffuser grid providing a barrier between mutually facing
(Continued)

sidewalls of the diffuser tiles. The diffuser grid is formed in a different material from the diffuser tiles. A lower side of the diffuser grid adapted to abut an upper side of the compartment grid.

19 Claims, 14 Drawing Sheets

(51) Int. Cl.

| | |
|---|---|
| ***F21V 11/06*** | (2006.01) |
| ***F21V 23/00*** | (2015.01) |
| ***H05B 33/12*** | (2006.01) |
| *F21Y 105/16* | (2016.01) |

(52) U.S. Cl.

CPC ......... *F21V 23/005* (2013.01); *F21Y 2105/16* (2016.08)

(56) References Cited

U.S. PATENT DOCUMENTS

| | | | | |
|---|---|---|---|---|
| 2005/0128743 | A1* | 6/2005 | Chuey | G04G 9/04 362/234 |
| 2008/0285280 | A1* | 11/2008 | Snijder | F21V 11/06 362/249.01 |
| 2009/0190353 | A1* | 7/2009 | Barker | G09F 9/3026 362/249.14 |
| 2013/0217294 | A1 | 8/2013 | Karunaratne | |
| 2016/0307496 | A1 | 10/2016 | Kubis et al. | |
| 2018/0023784 | A1* | 1/2018 | Tamura | G02F 1/133611 362/235 |
| 2019/0242549 | A1 | 8/2019 | Jurik et al. | |
| 2019/0258115 | A1* | 8/2019 | Kyoukane | G02F 1/133606 |
| 2020/0296167 | A1 | 9/2020 | Bdeir et al. | |
| 2020/0376402 | A1 | 12/2020 | Wellejus et al. | |
| 2021/0254811 | A1* | 8/2021 | Van Delden | G10K 11/162 |

FOREIGN PATENT DOCUMENTS

| | | | | |
|---|---|---|---|---|
| RU | 2013124096 | A | 3/2015 | |
| WO | 1995018435 | A1 | 7/1995 | |
| WO | WO-9518435 | A1 * | 7/1995 | G09F 9/3023 |
| WO | 2009096493 | A1 | 8/2009 | |
| WO | 2010023070 | A1 | 3/2010 | |
| WO | 2019145405 | A1 | 8/2019 | |
| WO | WO-2019234155 | A1 * | 12/2019 | F21V 11/06 |

OTHER PUBLICATIONS

DK Office Action corresponding to Application No. PA 2021 70132, dated Jul. 18, 2022, 3 pages.

DK Office Action with Search Report corresponding to Application No. PA 2021 70132, dated Oct. 22, 2021, 9 pages.

DK Office Action with Search Report corresponding to Application No. PA 2021 70131, dated Sep. 13, 2021, 7 pages.

International Search Report and Written Opinion corresponding to Application No. PCT/EP2022/057791, dated Aug. 16, 2022, 9 pages.

Ruiz Brothers, “Square NeoPixel Display with Black LED Acrylic”, 8×8 NeoMatrix and Feather M4 Express Overview, https://learn.adafruit.com/sqaure-neopixel-display-with-black-led-acrylic, 2020.

EP Communication corresponding to Application No. 22718598.0, dated Sep. 13, 2024, 54 pages.

* cited by examiner

MODULAR CONSTRUCTION SYSTEM LIGHT MATRIX

CROSS-REFERENCE TO RELATED APPLICATIONS

The present application is a U.S. National Stage Application of International Application No. PCT/EP2022/057723, filed on Mar. 24, 2022 and published on Sep. 29, 2022 as WO 2022/200479 A1, which claims the benefit and priority of Danish Patent Application No. 202170132, tiled on Mar. 25, 2021, each of which is incorporated herein by reference in its entirety for any purpose whatsoever.

FIELD OF THE DISCLOSURE

The present disclosure relates to a modular construction system and a modular construction system light matrix.

BACKGROUND

Modular construction systems as such are known in the art, as is various modular construction system units, for example motor units, for such modular construction systems etc. Modular construction systems comprises a plurality of construction elements, for example building blocks or bricks, which—when connected together—may be assembled to form a variety of different building structures. Motor units may be added to such modular construction systems in order to make parts of such system move. The present disclosure, a modular construction system light matrix, allows to provide a building structure formed from such construction elements, for example building blocks or bricks, frames, connectors, beams etc. with light output. For example, the modular construction system light matrixes according to the disclosure may be used to form eyes of a robot constructed from construction elements.

Modular construction systems are "modular" in the sense that the construction elements making up the construction systems are sized and shaped and comprise cooperating connection means allowing their interconnection, such that models/sets, such as figures robots, etc. may be constructed.

Learning systems, robotics construction sets, and so-called maker kits are known, which can provide a user with a variety of functionalities.

Modular construction elements as they are known from traditional modular construction systems, such as beams, plates, bricks, pegs, connectors, cog-wheels, etc., may be combined with functional modular construction elements, such as lighting elements, motors actuators, sensors, but also programmable processor units, which may also be digitally connectable with external devices, e.g. for programming or remote control. Such modular construction systems with enhanced functionality have proven their value in a play and/or learning context, not the least because they facilitate reliable, yet easily detachable mechanical connections between simple and functional modular construction elements, and because the functional modular construction element-, are adapted to each other to provide a positive and stimulating user experience.

Light matrices as such are known in the art. On example is shown in a video at the internet location https://learn.adafruit.comsgaurc-neopixel-display-with-black-led-acrylic; see especially from 2:15 to 2:38. Screen dumps from this video is shown in FIGS. 1A and 1B in the attached drawings. Although, this the video discusses the problem of light bleeding, the problem of light is not successfully solved in the light matrix shown.

Other examples of light matrixes are disclosed in WO 95/18435 A1, U.S. Pat. No. 4,254,453, US 2016/307496 A1 and KR 2018 0001022.

The phenomenon "light bleeding" occurs, in situations where two or more light sources are arranged in the vicinity of each other, and light from one lights source "bleeds" through openings in a light source housing or through the housing itself and distorts or changes the visual appearance of the light from the other light source.

It is clear that the problem may be solved using thick material dimensions or expensive light absorbing materials. However, such solutions are not always possible in small devices.

The present disclosure alleviates some of these problems of the prior art.

SUMMARY

In a first aspect, the objects of the disclosure are achieved by a modular construction system light matrix comprising

- a housing having side walls, an end wall, and a front edge encircling a front opening of said housing opposite to said end wall;
- an array of light emitting elements arranged on a printed circuit board, the printed circuit board being arranged in said housing,
- a compartment grid arranged in said housing, and having compartment grid walls extending from said printed circuit board towards said front opening of the housing, and forming an array of compartments, one compartment for each light emitting element; and
- a light diffusing element arranged at said opening of the housing,
- wherein the diffuser element comprises a plurality of diffuser tiles, each diffuser tile covering a compartment of the compartment grid,
- wherein each diffuser tile has a front surface, a back surface and sidewalls formed perpendicularly to the front surface,
- wherein the diffuser element comprises a diffuser grid providing a barrier between mutually facing sidewalls of the diffuser tiles,
- wherein the diffuser grid is formed in a material different from a material of the diffuser tiles, and
- wherein a lower side of the diffuser grid is adapted to abut against an upper side of the compartment grid.

Thereby, a very efficient prevention of light bleeding between compartments of the modular construction system light matrix and fields: sections of the diffuser element is achieved.

Preferably, the diffuser tiles are made by a material capable of allowing light to pass there through while diffusing the light.

The diffuser grid comprises first diffuser grid walls and intersecting second diffuser grid walls, and the first diffuser grid walls and intersecting second diffuser grid walls are aligned with the compartment grid walls of the compartment grid.

In either case, the compartment grid may be made by a light absorbing material.

In a further embodiment, the diffuser grid is made from a light absorbing material. Alternatively, the diffuser grid is made by a light reflecting material.

In either case the diffuser grid may be formed in the same material as the side walls of the housing.

In some embodiments, outwardly facing sidewalls of the diffuser tiles extend in front of said front edge and forms an extension of the sidewalls of the housing and flush therewith.

Thereby, a visual effect of the fields of the diffuser element is also obtained in the sideways direction of the diffuser element and not just at the front.

In some embodiments, each diffuser tile comprises a compartment portion extending into a compartment provided by the compartment grid.

Thereby, a very efficient light bleeding prevention between the matrix fields is obtained while at the same time the distribution of the light over the entire outer surface of the diffuser tiles is achieved.

In an embodiment, outwardly facing surfaces of the compartment portion of the diffuser tiles arranged at external edges and corners of the diffuser element are angled relative to the outwardly facing sidewalls of the diffuser tiles. Thereby, it is achieved that light emitted from the light emitting elements is directed also towards the side walls of the diffuser tiles. Preferably, the angle between the side walls of the diffuser tiles and the corresponding outwardly facing surface is acute.

In an embodiment, the compartment portion of the diffuser tiles formed at external corners of the diffuser element comprises a first surface formed between outwardly facing side surfaces at the external corners of the diffuser element, which first surface interconnects the two outwardly facing side surfaces of the compartment portion. Thereby, it is achieved that light emitted from the light emitting elements is directed also towards the corners of the diffuser element. Preferably, the first surface forms an angel of 45° relative to the two adjacent outwardly facing side surfaces.

In further embodiments, the diffuser tiles are interconnected by tile connecting element formed integrally with and in the same material as the diffuser tiles.

Thereby, it is made possible that the diffuser grid may be formed in spaces between the diffuser tiles as the second stage in a two stage moulding process (two component moulding process), where the diffuser tiles with the connecter elements are formed in the first stage of the two stage moulding process (two component moulding process). In an embodiment thereof; the connecting elements are protrusions extending from the lower surface of the diffuser tiles, at corners of the diffuser tiles, where four neighbouring diffuser tiles meet.

In further embodiments, internal surfaces of the compartments of the compartment grid are covered by internal walls formed in a material different from the material of the compartment grid. The internal walls may be formed in a light reflecting material.

In either case, in an embodiment, the internal walls are made from the same material as the sidewalls of the housing.

In further embodiments, the internal walls are formed integral with the housing. For example, at least the sidewalls of the housing may be formed together with the internal walls in a second injection moulding stage of a two stage moulding process (two component moulding process), where a compartment grid formed in the first injection moulding stage of a two stage moulding process (two component moulding process) is used as core in the second injection moulding stage. In further embodiments, the internal walls taper outwards towards the diffuser element.

Also, in any of the above mentioned embodiments, internal walls of the compartment grid may taper outwards towards the diffuser element.

Also, in any of the above mentioned embodiments, outwardly facing sidewalls of the diffuser element may extend in front of said front edge and form an extension of the sidewalls of the housing and flush therewith.

In further embodiments, the housing comprises connector openings complementary with connector pegs of a modular construction system.

In a second aspect, the objects of the disclosure are obtained by a modular construction system light matrix comprising

- a housing having side walls, an end wall and a front edge encircling a front opening of said housing opposite to said end wall;
- an array of light emitting elements arranged on a printed circuit board, the printed circuit board being arranged in said housing;
- a compartment grid arranged in said housing, and having compartment grid walls extending from said printed circuit board towards said front opening of the housing, and forming an array of compartments, one compartment for each light emitting element; and
- a light diffusing element arranged at said opening of the housing, wherein outwardly facing sidewalls of the diffuser element extend in front of said front edge and forms an extension of the sidewalls of the housing and flush therewith.

In an embodiment the modular construction system light matrix according to the second aspect,

- the diffuser element comprises a plurality of diffuser tiles, each diffuser tile covering a compartment of the compartment grid,
- wherein each diffuser tile has a front surface a back surface and sidewalls formed perpendicularly to the front surface,
- wherein the diffuser element comprises a diffuser grid providing a barrier between mutually facing sidewalls of the diffuser tiles,
- wherein the diffuser grid is formed in a material different from a material of the diffuser tiles, and
- wherein a lower side of the diffuser grid is adapted to abut against an upper side of the compartment grid.

In further embodiments of the second aspect of the disclosure, the modular construction system light matrix according to the second aspect, may further comprise any of the further features of the embodiments, of the first aspect of the disclosure.

It should be emphasized that the term "comprises-comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1A:
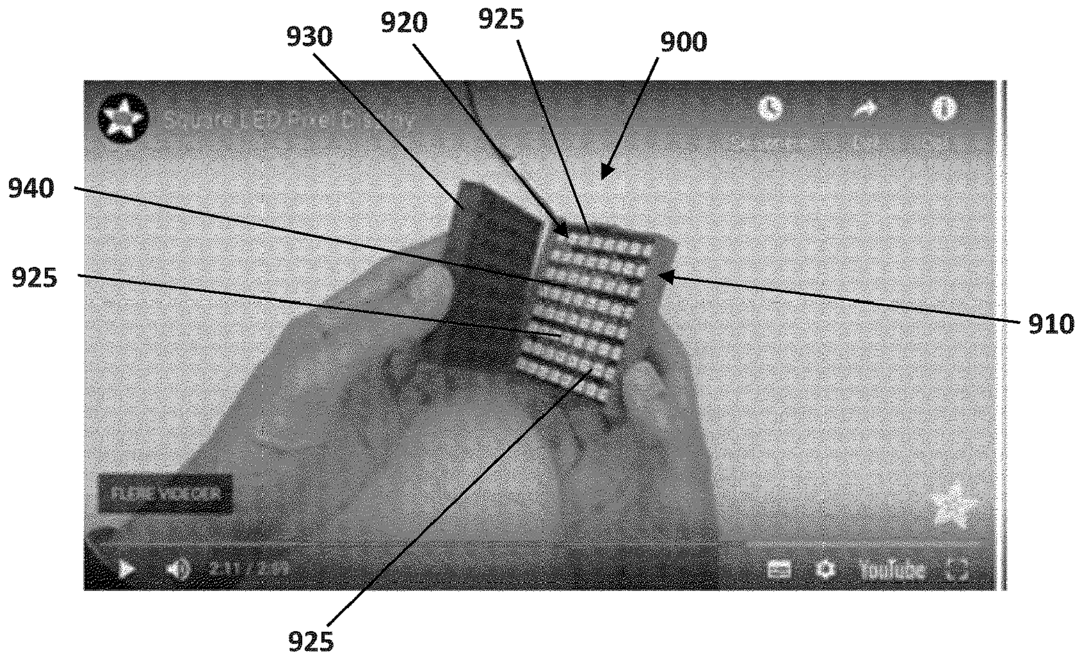
FIG. 1A (Prior Art)
FIG. 1A illustrates a prior art light matrix, showing components thereof in a disassembled state, a housing with an array of LED's and a compartment grid made in a dark plastic material.

The subject technology overcomes many of the prior art problems associated with lighting for modular construction systems. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 1B:
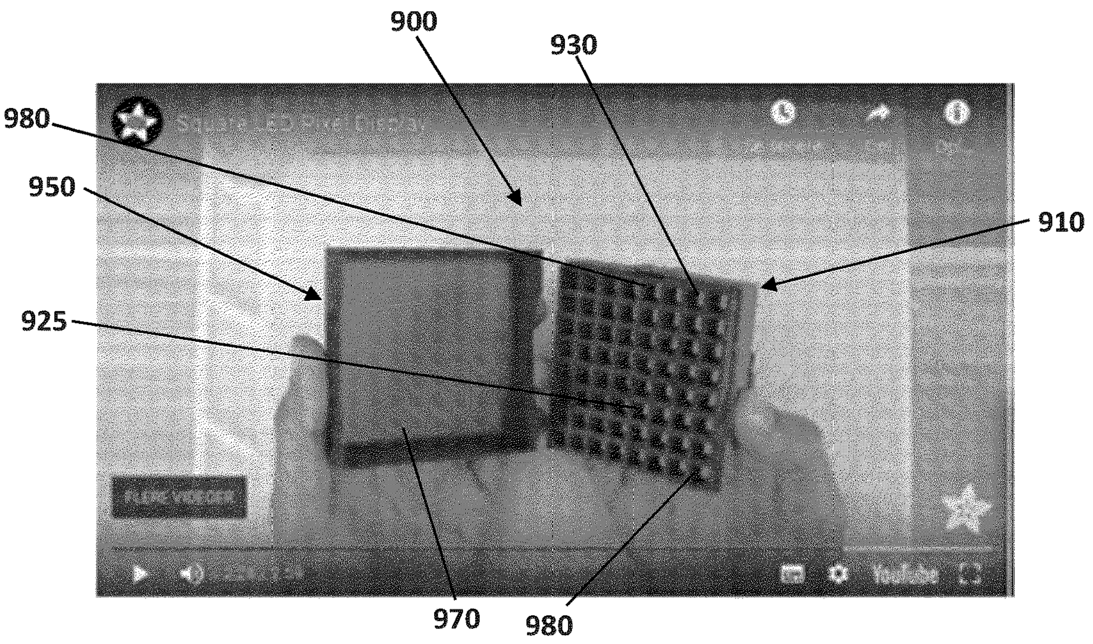
FIG. 1B (Prior Art)
FIG. 1B shows further components of the prior art light matrix of FIG. 1A, a diffuser plate arranged in an upper frame.

FIGS. 1A-B show an example of a prior art light matrix 900, in a disassembled state to unveil components thereof. FIG. 1A shows a square lower housing part 910 having a LED array 920 formed inside the lower housing part 910, and a grid 930 made in a dark plastic material and configured to form a compartment around each of the LEDs 925 of the LED array 920. The LEDs are arranged in a regular two-dimensional pattern on a surface of a plate 940—presumably a printed circuit board, the plate 940 being mounted in the lower housing part 910.

In FIG. 1A, the grid 930 is disassembled from the lower housing part 910. In FIG. 1B the grid 930 is arranged in the lower housing part 910 and forming a compartment around each of the LEDs 925 of the LED array 920 and abutting on an upper surface of the plate 940.

Also shown in FIG. 1B is an upper housing part 950 in the form of an upper frame 960 and a diffuser plate 970 arranged in the upper frame 960. The diffuser plate 970 is a continuous unitary structure, made in a material suitable for diffusing light travelling through the diffuser plate 970. The diffuser plate 970 is sized and shaped to cover an opening provided in and through a top surface—defined by a circumferential flange of the upper frame 950—by fitting into the upper frame 950 and abutting on lower surface of the circumferential flange of the upper frame 950.

The upper housing part 950 is sized and shaped to cooperate with the lower housing part 910 to form a closed, boxed shaped light matrix unit (not shown).

The LEDs 925 of the LED array 920 may be of a type capable of emitting light in several colors or the U Ds 925 may each emit a different color.

The purpose of the grid 930, which is made in a dark plastic material is to form compartments 980 for each LED 925, such that light from one compartment does not "bleed" into a neighboring compartment, and such that the compartments 980 partitions the front surface of the diffuser plate into an array of square fields, which may show different colors in neighboring fields with light from one field "bleeding" into, and influencing the light in another square fields. As mentioned above, this is not always successfully achieved, as the diffuser plate material "draws" light from one compartment to another.

Figure 2A:
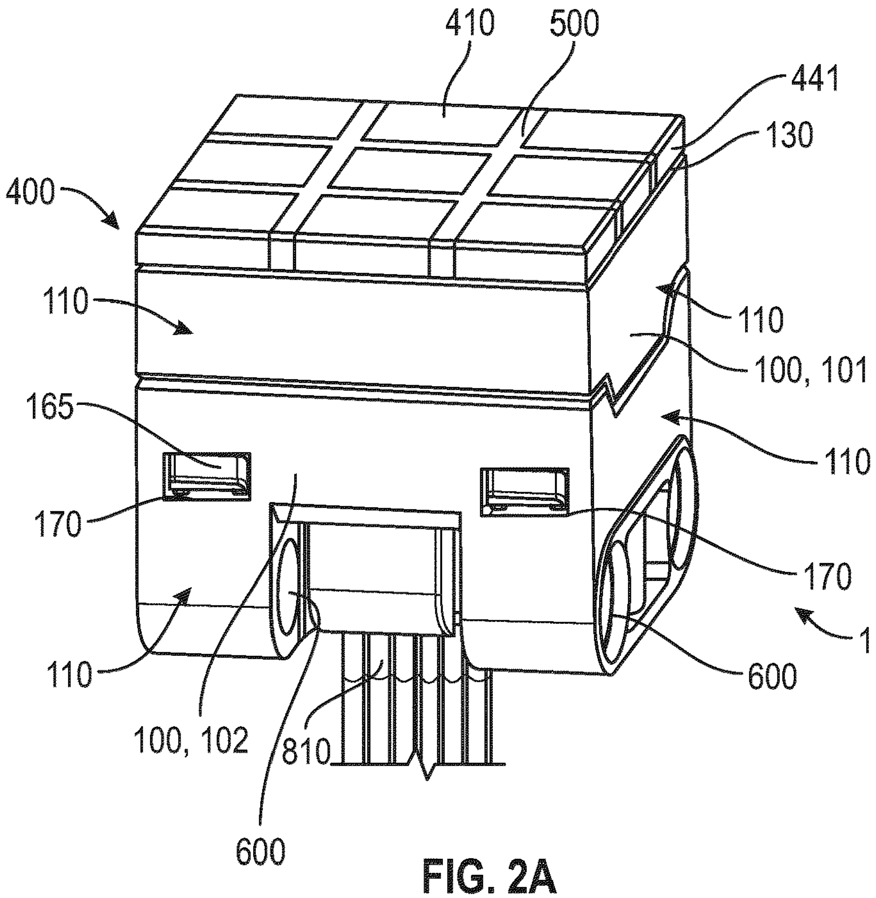
FIG. 2A, in a perspective view, shows a modular construction system light matrix according to the disclosure.
Figure 2B:
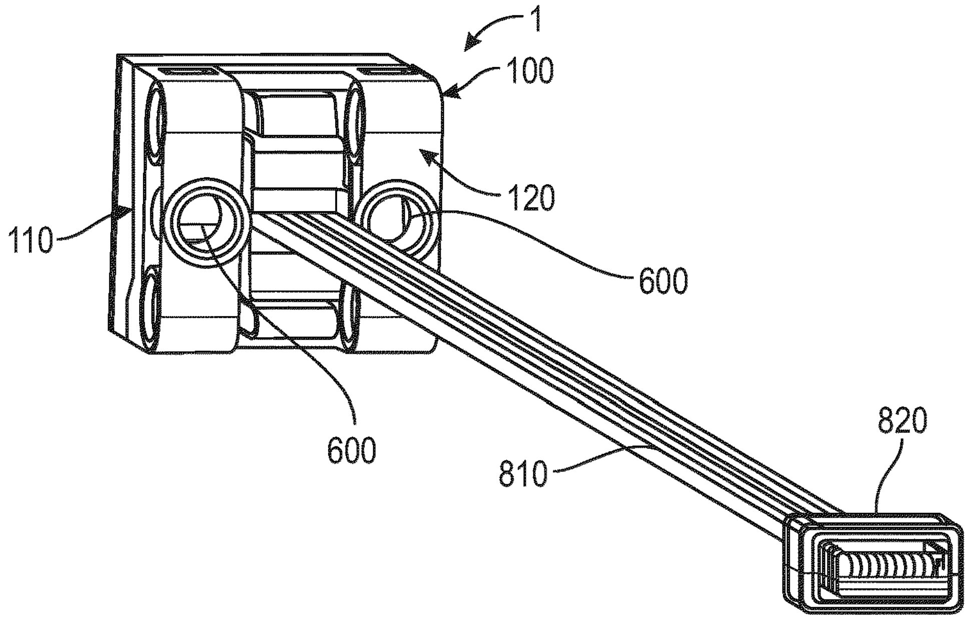
FIG. 2B, also in a perspective view, shows the modular construction system light matrix from the rear or bottom side.
Figure 3:
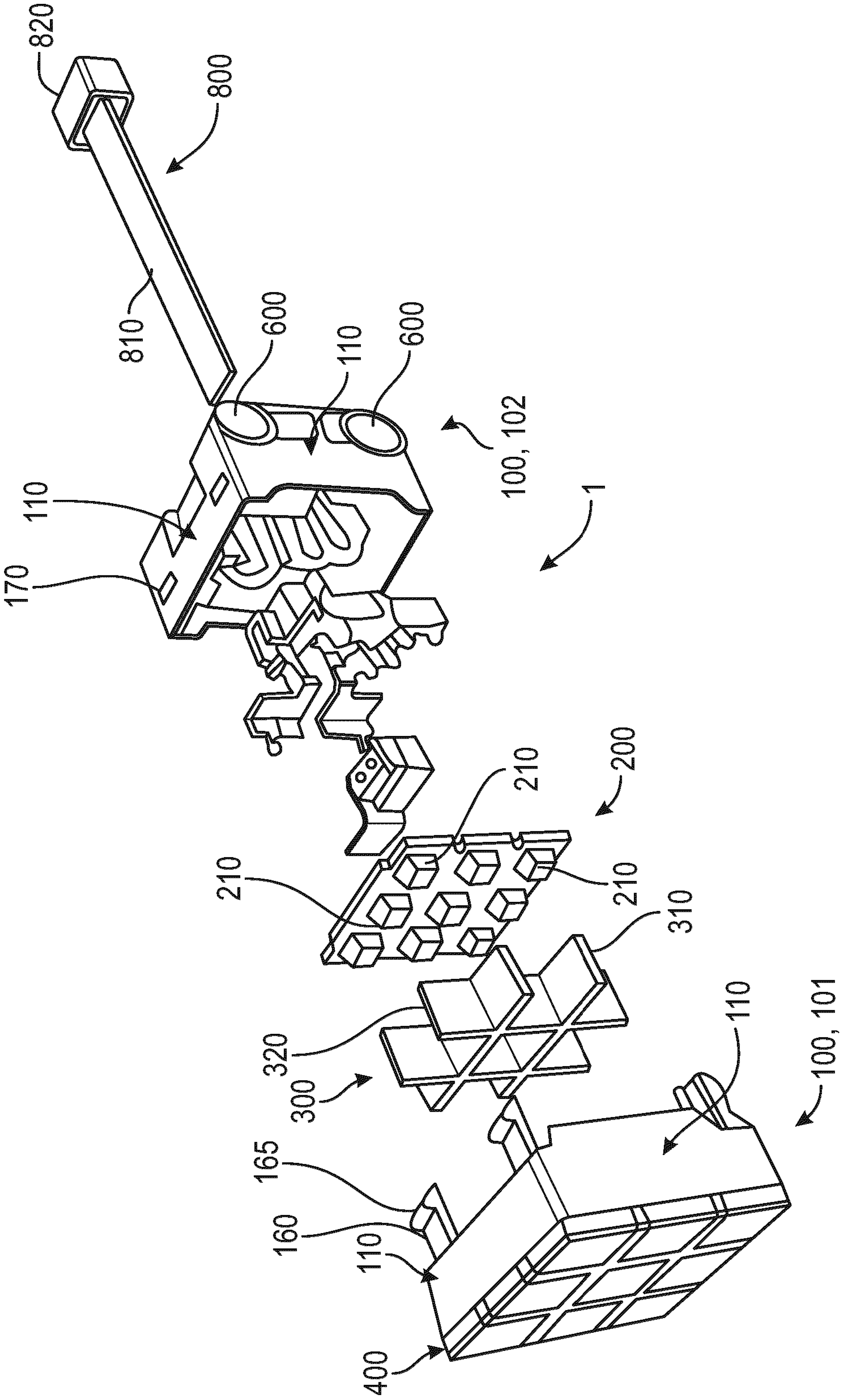
FIG. 3, in a perspective view, shows a modular construction system light matrix according to an embodiment of the disclosure, in a disassembled state.

Turning now to the present disclosure, FIG. 2A, in a perspective view, shows a modular construction system light matrix 1 according to some embodiments of the disclosure. FIG. 2B, also in a perspective view, shows the modular construction system light matrix from the rear or bottom side. FIG. 3, also in a perspective view, shows an embodiment of the modular construction system light matrix 1, in a disassembled state.

The modular construction system light matrix 1—hereinafter called a light matrix 1-13 comprises a housing 100, an array 200 comprising a plurality of light emitting elements 210 arranged within the housing 100, a light diffusing element 400, and a compartment grid 300, arranged in the housing 100 between the array 200 of light emitting elements 210 and the light diffusing element 400.

The housing 100 may—as shown—comprise an upper housing part 101 and a lower housing part 102, where the upper housing part 101 and the lower housing part 102 are interconnectable to form the complete housing 100.

The plurality of light emitting elements 210 may be arranged on a 2D grid such as a grid defining, for example, a rectangle, a square, a circle, etc. If the grid is in a rectangular or square shape, the light matrix may be a square matrix, i.e. have the same number of light emitting elements 210 in its rows and columns, e.g. a 2×2, 3×3, 4×4, etc. However, in other embodiments, the number of rows and columns of light emitting elements 210 may differ. The separate light emitting elements 210 may be Light Emitting Diodes (LEDs), and they may be of the same type and/or model, or different.

The colour and/or the intensity of each of the light emitting elements 210 may be controlled individually, such that some or all of the light emitting elements may be on or off at a given time.

The light matrix 1 can receive digital information and preferably is provided with processing power to decode digital information to regulate the colour and intensity of each of the light emitting elements, for example as requested directly by a user or by a software program. By "regulating" is meant that the colour and intensity is set appropriately, i.e. the colour may be changed, the intensity may be increased or decreased, or the light turned off (intensity=zero).

Preferably, the array 200 of light emitting elements 210 may as shown be regular 3×3 array (orthogonally arranged in 3 rows and 3 columns) of light emitting elements 210, i.e. with a total of 9 light emitting elements 210.

The light emitting elements 210 are preferably—and as shown in e.g. FIG. 3—mounted on a printed circuit board (PCB) 250.

Normally, PCB's are formed in a green material. This material however is quite transparent to light. In order to reduce this source of light bleeding through the housing 100, such as the back side of the housing or lower housing part 102, in preferred embodiments, a black-more light absorbing—PCB material is chosen.

The control for regulating the light emitting elements 210 may be provided as components on the PCB 250.

The light matrix 1 may further comprise electronic components, such as electronic control components, an energy source (e.g. a battery package), etc. Preferably, any such further electronic components are provided in the lower housing part 101 or on the PCB 250, preferably on the back side of the PCB.

The light matrix 1 may further comprise means for communicating with external devices or a user. For example control input for the light emitting elements 210 may be provided from an external device being in wireless communication (not shown) with the light matrix 1. In other embodiments, and as shown in FIGS. 2A, 2B and 3, the light matrix 1 may comprises a cable unit 800 comprising one or more electrical cables 810 and a connector plug 820 configured for connecting the light matrix 1 with an external device. Thereby, information (control signals) and/or energy (electrical) may be transferred to the light matrix 1 from the (not shown) external device.

In an embodiment—and as shown throughout the figures—the housing 100 preferably has a quadratic cross section, when the array 200 of light emitting elements 210 is an nn array.

As mentioned above, the housing 100 may comprise two parts, an upper housing part **10*t* and a lower housing part 102**. It will however be appreciated that the housing may—in not shown embodiments—be formed as a single part. In yet other embodiments the housing may comprise more than two parts.

In any case the housing 100 is preferably a box-shaped structure having a set of side walls 110 and preferably a bottom wall/end wall 110. Thus, at least a portion of the housing 100 has the shape of an open box before mounting of other components. In embodiments, where the housing 100 comprises an upper housing part 101 and a lower housing part 102, each of the sidewalls 110 has a wall portion being defined on the upper housing part 101 and a wall portion defined on the lower housing part 102. In this case the bottom wall; End wall 110 is provided by the lower housing part 102, and the lower housing part 102 has the shape of an open box before mounting of other components. The upper housing pan 101, in this case is a tubular structure, having sidewalls 110 and open upper and lower ends (before mounting of other components. The sidewalls of the upper housing part 101 and the sidewalls 110 of the lower housing part 102 are to cooperate, such that when the upper housing part 101 and the lower housing part 102 are assembled, they collectively form the housing 100.

The side wall 110 of the housing 100—and thereby the housing 100—has an upper edge or front edge 130, which encircles an upper or front opening 140 of the housing 100. The front opening 140 is arranged opposite to said end wall 120 in the housing 100.

In the embodiments shown herein, the upper edge or front edge 130 and the upper or front opening 140 are provided on the upper housing part 101.

The above mentioned light diffusing element 400 is arranged on and connectable to the housing 100, such that the light diffusing element 400 covers the front opening 140. In some embodiments, and as shown in e.g. FIGS. 4 and 5, a lower or downwardly facing edge 470 of the light diffusing element 400 is configured to rest on the front edge 130 of the housing 100. In other, not shown, embodiments a light diffusing element for example as shown in the figures, and described below in connection with FIGS. 6A-D may alternatively be configured to be located between internally facing sides of the sidewalls of the housing or an upper housing part thereof.

In the embodiments shown herein, the light diffusing element 400 covers the front opening 140 provided in the upper housing part 101, and the lower or downwardly facing edge 470 of the light diffusing element 400 is configured to rest on the front edge 130 of the upper housing part 101 of the housing 100. Thereby, the diffuser element 400 and the housing 100 can be configured such that the sidewalls 440 of the diffuser element 400 are flush with the sidewall 110 of the housing 100, as shown in e.g. FIG. 2A.

As mentioned above, the light matrix 1 comprises a compartment grid 300. The compartment grid 300 may be formed in a light absorbing material. In some embodiments the compartment grid 300 may be made in a black polymer material.

The compartment grid 300 is arranged within the housing 100. The compartment grid 300 comprises grid walls (may also be called compartment grid walls), two or more first compartment grid walls 310, and two or more a second set of first compartment grid walls 320. The first compartment grid walls 310 are arranged in parallel to each other. The second compartment grid walls 320 are arranged in parallel to each other. The first compartment grid walls 310 are arranged perpendicular to the second compartment grid walls 320. Thus, the first compartment grid walls 310 and the second compartment grid walls 320 intersect, and form compartments 330 between them.

Preferably, the compartment grid 300 is configured, such that one compartment 330 is provided for each light emitting element 210 of the array 200 of light emitting elements 210.

Figure 4:
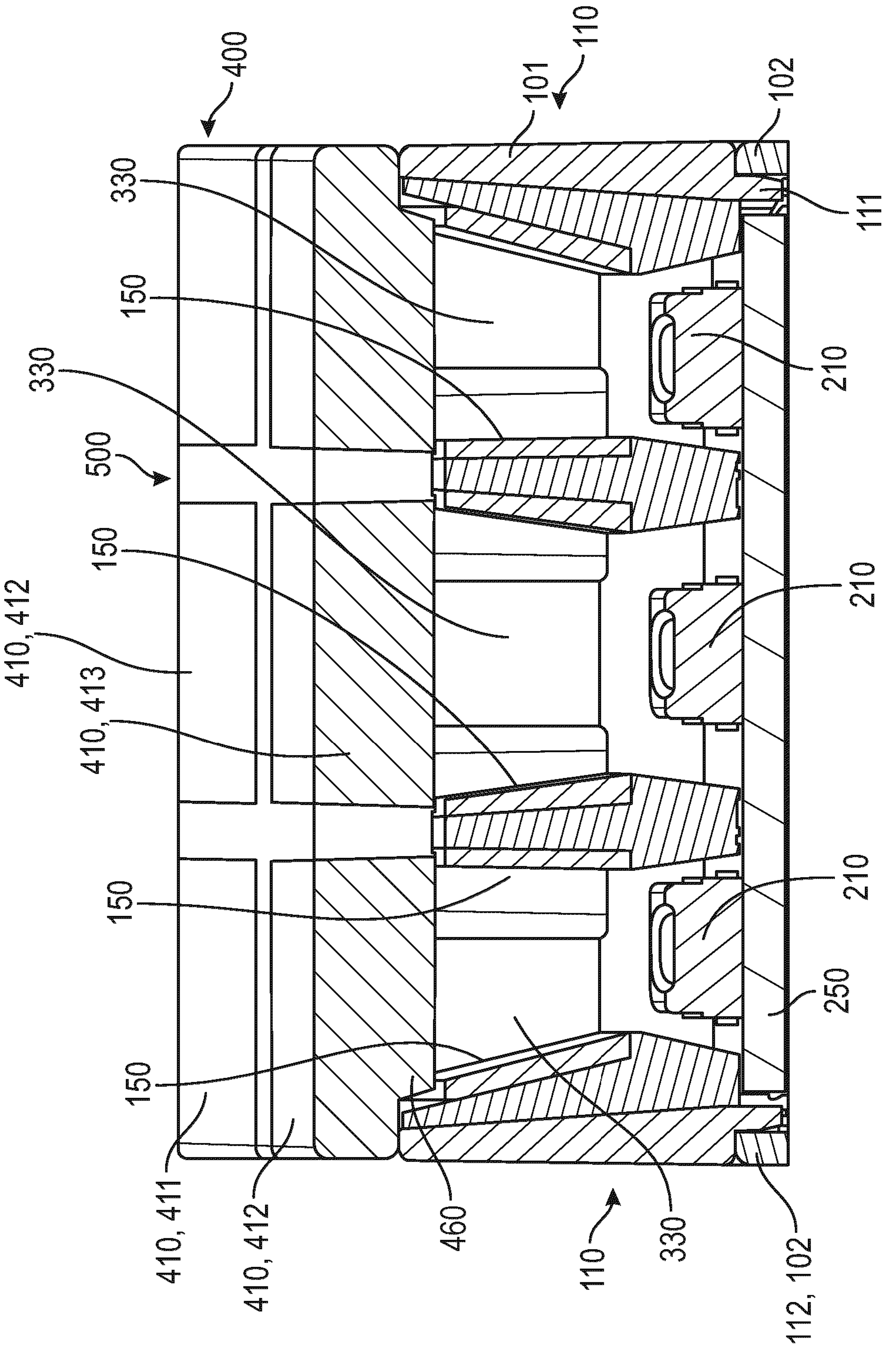
FIG. 4, in a perspective sectional view, shows an upper portion of a modular construction system light matrix according to an embodiment of the disclosure.
Figure 5:
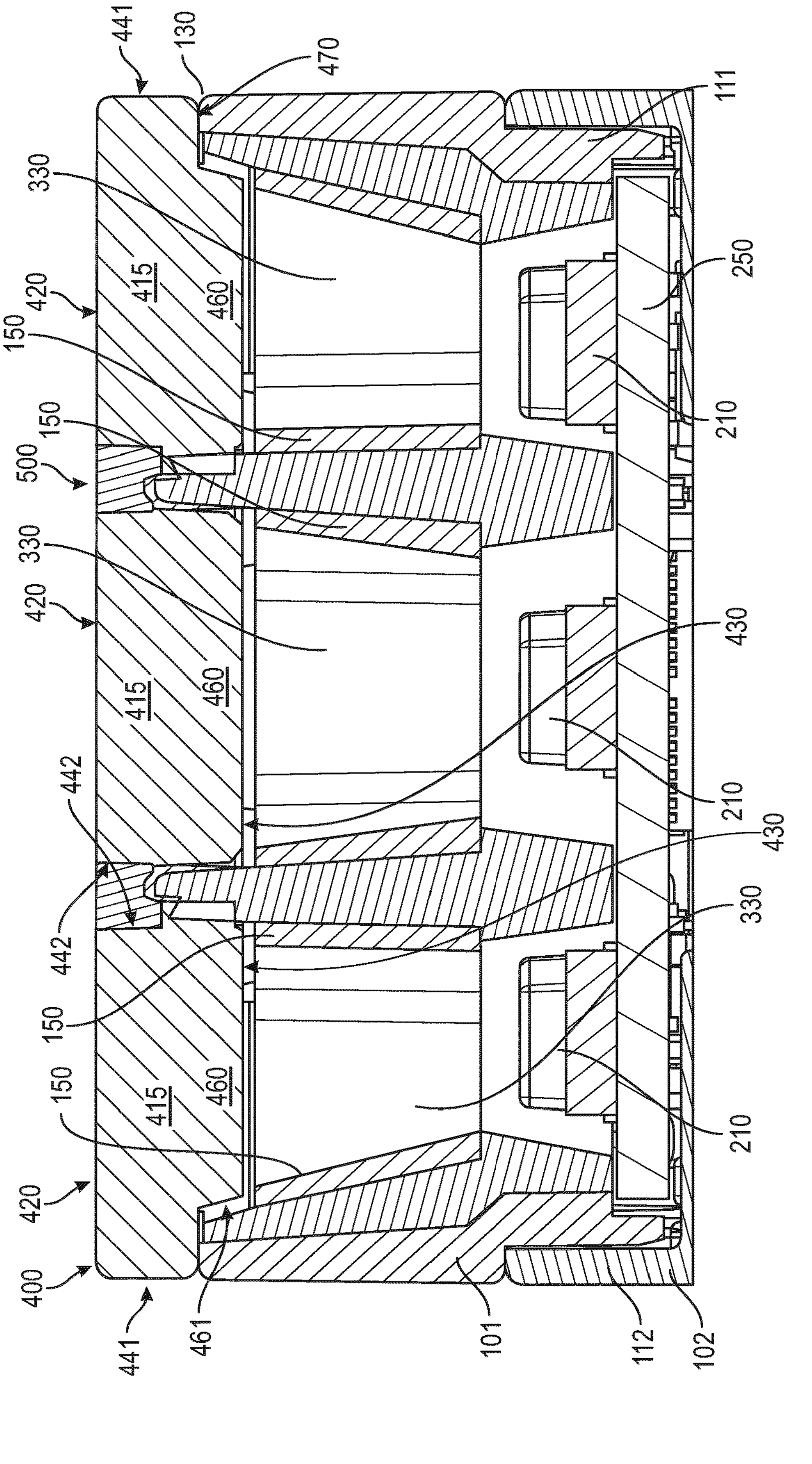
FIG. 5, in a side sectional view, shows an upper portion of a modular construction system light matrix according to an embodiment of the disclosure in a section different than in FIG. 4.

The compartment grid 300 is further configured such that the compartment grid walls/grid walls 310, 320 allows the compartment grid 300 to extend from the surface (such as the upper/upwardly facing surface of a PCB 250) on which the light emitting elements 210 are arranged, and towards said front opening 140 of the housing 100, such as to a bottom/lower/downwardly facing surface of the light diffusing element 400, as shown in e.g. FIGS. 4 and 5.

In some embodiments, and as shown in FIG. 3, the compartment grid 300 may be an individual element which is mounted within the housing 100 during an assembly stage of manufacturing the light matrix 1.

However, in other embodiments, and as described in further detail below, the compartment grid 300 may be formed together with the housing 100, for example in a two stage injection moulding process (two component moulding process).

In the embodiment shown in FIG. 3, the compartment grid 300 has two first compartment grid walls 310 and two intersecting Ling second compartment grid walls 320 forming a grid or array of nine compartments 330, in a 3×3 array, where only the central compartment 330 is closed on all sides, and where the eight compartments 330 formed along the perimeter of the compartment grid 300 are open in the sense that these compartment have an externally facing side, facing an inner surface of the housing side walls 110 (when assembled), which is not covered by a wall.

It will be appreciated, that in some embodiments also a "loose" compartment grid 300 as shown in FIG. 3 may have first compartment grid walls 310 and second compartment grid walls 320 formed along and facing the inner surface of the housing side walls 110 (when assembled), such that all of the compartment 330 are closed sideways.

In embodiments shown in FIGS. 4, 5, 7A, 7B, 8A-F, and 9A-C, the compartment grid 300 comprises first compartment grid walls 310 and second compartment grid walls 320 formed along and facing the inner surface of the housing side walls 110, such that all of the compartment 330 are closed sideways. In this embodiment, the compartment grid 300 has four first compartment grid walls 310 and four intersecting second compartment grid walls 320 forming a grid or array of nine compartments 330, in a 3×3 array, where all the compartments are closed on all sides.

The housing 100 is provided with at least one modular connector 600 for connecting the light matrix 1 to another construction element of a modular construction system. In the embodiments illustrated in the figures, see FIGS. 2A-B, 3, and 7A-B, the housing 100 is provided with six such modular connectors 600, two in the end wall 120, and two in each of two opposed side wall 110 of the housing 100. In these embodiments the modular connectors 600 are provided in the lower housing element 102. In other embodiments there may be fewer or more modular connectors 600. In other embodiments one or more connectors may be provided in the upper housing part 101 also. The modular connectors 600 are formed as indentions into and through the housing 100. The connectors are preferably connector openings. Preferably, the one or more modular connectors 600 are configured for cooperating with and connecting to various types of construction elements of a modular construction. An example of a construction system having such connectors is known in the an, e.g. under the trade name LEGO TECHNIC), marketed by LEGO A/S.

Now returning to the compartment grid 300, embodiments thereof are shown in more detail in e.g. FIG. 4. FIG. 4, in a perspective sectional view, shows an upper portion of a modular construction system light matrix according to an embodiment of the disclosure. The section is taken along a side wall of the light matrix 1 housing 100.

In some embodiments the compartment grid 300 is formed in a light absorbent material. In some embodiments the compartment grid 300 is formed in in a polymer material. Preferably, the compartment grid 300 is formed in a polymer material suitable for injection moulding, in some embodiments, the compartment grid 300 is formed in a black polymer material. Such a material may be black colored ABS plastic, which has high light absorption properties and low light reflection properties. This help containing the light and stopping it from traveling between the compartments 330, and through the outermost compartment grid walls 310, 320 and the outer walls, sidewalls 110, of the housing 100.

The housing 100 or at least the upper housing portion 101 may be formed in a reflective polymer material, and preferably in a polymer material suitable for use in an injection moulding process.

In some embodiments, and as described in further detail below, the housing 100, or at least the upper housing part 101 thereof may further comprises internal walls 150, see e.g. FIG. 4, also made in a light reflecting material. This material may be the same as used for the housing 100 as such. In such cases, the black ABS plastic material (or materials with similar properties) of the compartment grid 300 prevents the light from zig zagging between white reflective and the black parts and between the (black) PCB 250 and the black compartment grid 300.

In all embodiments described above and below, preferably the diffuser element 400 and the compartment grid 300 are assembled, to avoid air gaps there between. In practice such airgaps may not be possible to eliminate entirely, for example due to production tolerances. In such cases the black or other light absorbent properties of the compartment grid 300 may secure that, where at the few places where there are airgaps between the upper edge of the reflecting inner walls and the diffuser element, it is secured, that the compartment grid 300 is always on one side of these airgaps. This limits the amount the light that can "zig-zag" between the parts, and thereby the light bleeding between the compartments 330 and between compartments 330 and the sidewalls 110 of the housing 100.

FIG. 5, in a side sectional view, shows the upper portion of a modular construction system light matrix according to the same embodiment of the disclosure as FIG. 4, but in a section different than in FIG. 4.

Turning now to the diffuser element 400, preferred embodiments are illustrated in FIGS. 6A-D.

Portions of the diffuser element 400 is preferably formed in a material capable of allowing light to pass there through while diffusing the light, or a transparent material treated to give light diffusing properties.

In an embodiment the diffuser element 400 comprises a plurality of diffuser tiles 410. A diffuser tile 410 is provided for each compartment 330 of the compartment grid 300, and covers the compartment 330 with which it is associated.

In embodiments, where the diffuser element 400 comprises a plurality of diffuser tiles 410, the diffuser tiles are preferably formed in a material capable of allowing light to pass there-through while diffusing the light, or a transparent material treated to give light diffusing properties.

In the embodiments shown in the figures, there are 9 diffuser tiles 410 arranged in a 3×3 regular array. However, generally, the diffuser element is provided such that there is a diffuser tile 410 for each light emitting element 210. Similarly, the above mentioned compartment grid 300 is manufactured such that there is one compartment for each light emitting element 210.

Each of the diffuser tiles 410 comprises a front surface 420, a back surface 430 and sidewalls 440.

The front surface 420 and the back surface 430 are formed parallel to each other.

The sidewalls 440 of a diffuser tile 410 are formed perpendicularly to the front surface 420.

Because the diffuser tiles 410 are arranged in a regular, two-dimensional array, some of the sidewalls 440 of the diffuser tiles 410 will face the sidewalls 440 of the neighbouring diffuser tiles 410, i.e. they have mutually facing sidewalls 442, while the diffuser tiles 410 formed along edges of the diffuser element 400 also have outwardly facing sidewalls 442, i.e. sidewalls not facing other diffuser tiles 410.

As shown, the diffuser element 400 comprises a diffuser grid 500 providing a barrier between the mutually facing sidewalls 442 of the diffuser tiles 410.

This diffuser grid 500 is preferably formed in a material different from a material of the diffuser tiles 410.

The diffuser grid 500 comprises an array of diffuser grid walls, first diffuser grid walls 510 and intersecting second diffuser grid walls 520. The first diffuser grid walls 510 and intersecting second diffuser grid walls 520 are aligned with the compartment grid walls 310, 320 of the compartment grid 300, when the diffuser element 400 is assembled with the housing and the compartment grid. Preferably, the compartment grid 300 and the diffuser element 400 are also assembled such that the diffuser grid walls 510, 520 abut on the compartment grid walls 310, 320, to minimize air gaps there between as also mentioned above. Thereby, light bleeding between the compartments 330 and the square light fields or zones provided by the diffuser tiles 410 is minimized or even prevented.

So, a lower side (or at least a portion thereof) of the diffuser grid 500 is adapted to abut against an upper side (or at least a portion thereof) of the compartment grid 300. This means that the compartment grid 300 and the diffuser grid 500 are separate entities, that when the light matrix 1 is assembled abuts against each other.

In some embodiments, and as exemplified below, the diffuser grid 500 and the diffuser tiles are formed together as a single unit, for example in a two stage moulding process.

In some embodiments, the diffuser grid 500 is formed in a light absorbing material. However, in alternative embodiments the diffuser grid 500 is formed in a light reflecting material.

In some embodiments, the diffuser grid 500 may be formed in the same material as the housing 100, or at least the same material as the side walls 110 of the housing 100.

In some embodiment, and as shown in for example FIGS. 4 and 5, the outwardly facing sidewalls 441 of the diffuser element 400 and in embodiments, where the diffuser element 400 comprises diffuser tiles 410, the outwardly facing sidewalls 441 of the diffuser element 400/diffuser tiles 410 extend in front of or above the front edge 130, such that the outwardly facing sidewalls 441 of the diffuser element 400: diffuser tiles 410 form an extension of the sidewalls 110 of the housing 100 in the plane of the sidewalls 110 of the housing 100. The outwardly facing sidewalls 441 of the diffuser element 400/diffuser tiles 410, are preferably arranged such that they are flush with the sidewalls 110 of the housing 100.

In such embodiments, it is secured that light in a square light field or zone defined by the compartment 330, is visible also to the side (perpendicularly to the sidewalls 110 of the housing 100).

It will be appreciated, that in principle a diffuser element 400 as described above, may—alternatively to being arranged to extend in front of the front edge 130 of the housing 100—be arranged in the front opening 140 of the housing 100, with the sidewalls 110 of the housing 100 covering the outwardly facing sidewalls 441 of the diffuser element 400/diffuser tiles 410.

In either of the above embodiments, the each diffuser tile 410 may comprise a main body part 415 and a compartment portion 460 extending downwards from the main body part 415. This downwardly extending compartment portion 460 is configured for extending into a compartment 330 provided by the compartment grid 300. This may be appreciated from FIG. 4 or 5.

On the diffuser tiles 410 being arranged along the edges of the diffuser element 400 (i.e. diffuser tiles 412) and on the diffuser tiles 400 being arranged in the corners of the diffuser element 400 (diffuser tiles 411), the main body part 415 of the diffuser tiles 410, 411, 412 may comprise a downwardly facing edge 470 or surface 470 formed as a ledge between the main body part 415 and the compartment portion 460. This downwardly facing edge 470 may be configured for abutment on the front edge 130 of the housing 100 (in embodiments where the diffuser element 400 extend in front of the housing), or on an upper edge of the compartment grid 300 (in embodiments, where the diffuser element 400 is framed by the sidewalls 110 of the housing 100).

Figure 6A:
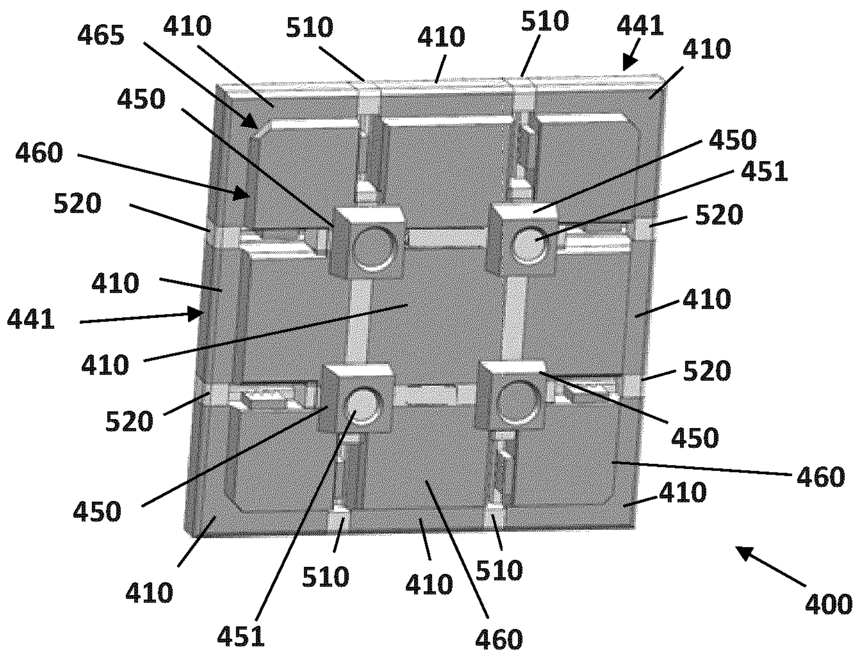
FIG. 6A, in a perspective view, shows a diffuser element for a modular construction system light matrix according to an embodiment of the disclosure, and viewed from an inner/internal/bottom side thereof.
Figure 6B:
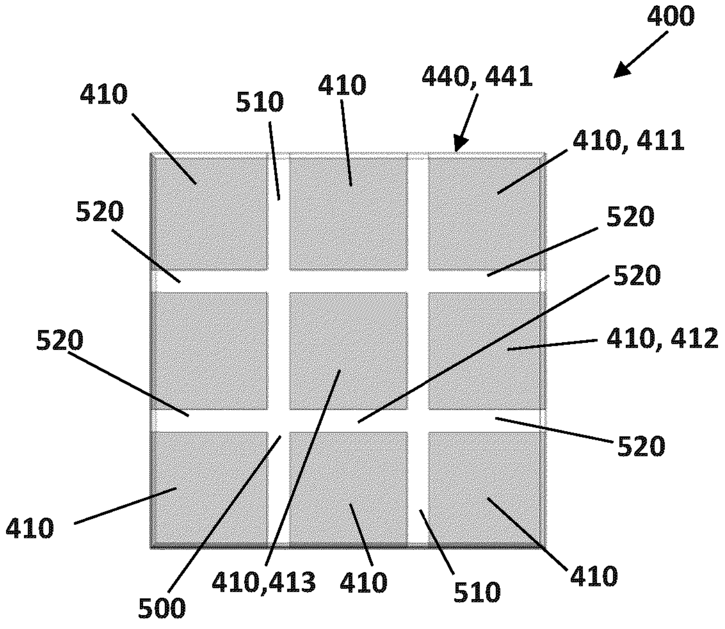
FIG. 6B shows the diffuser element of FIG. 6A in a front view.
Figure 6C:
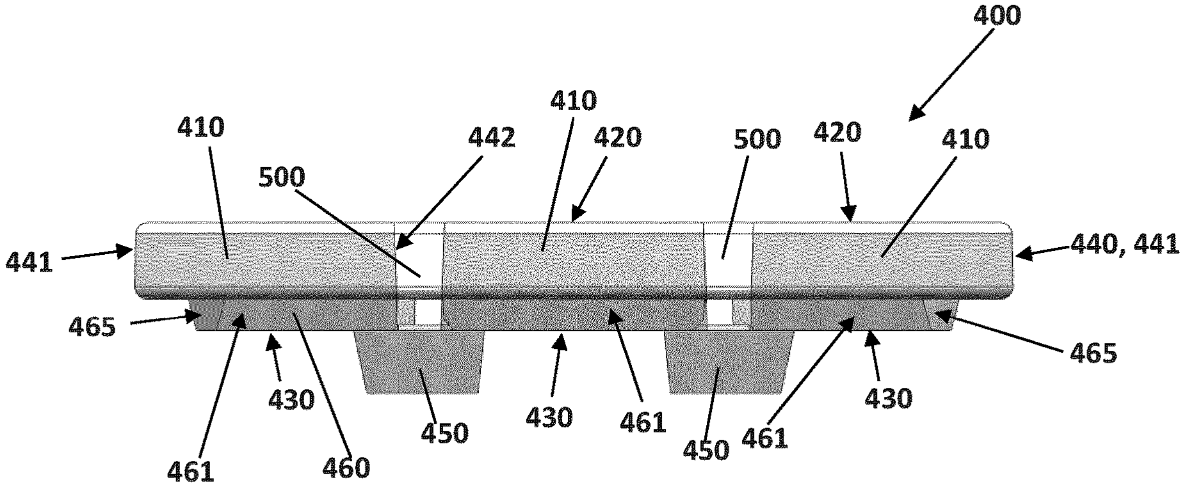
FIG. 6C shows the diffuser element of FIG. 6A in a side view.
Figure 6D:
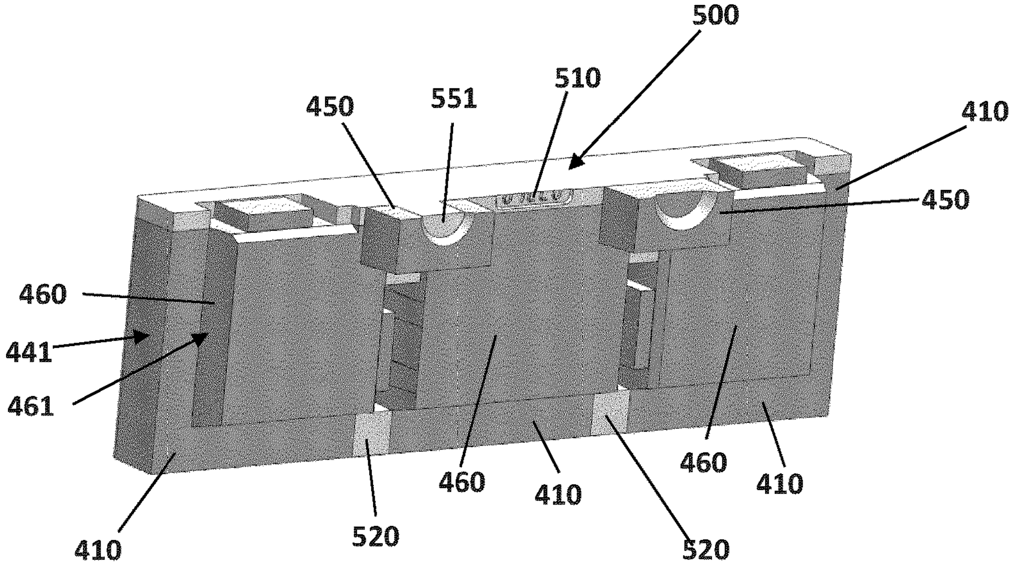
FIG. 6D, in a perspective view, shows a section through the diffuser element of FIG. 6A.

As shown in e.g. FIGS. 6*a* and 6D, the diffuser tiles 410, or the main body part 415 are generally square (seen in a cross section parallel to the upper/upwardly facing surface 420 of the diffuser tiled 410.

As also shown in e.g. FIGS. 6*a* and 6D, the compartment portion 460 of the diffuser tiles 410 is also generally square (seen in a cross section parallel to the upper upwardly facing surface 420 of the diffuser tiled 410). However, dependent on the diffuser tile being arranged at a corner of the diffuse element 400 (diffuser tiles 411) or at a side edge (diffuser tiles 412) or inside the array (diffuser tiles 413), the compartment portion 460 may be placed differently relative to the main body part 415.

The compartment portion 460 of a diffuser tile 410 have side surfaces. Some of the side surfaces 462 of the compartment portion 460 face towards compartment portion 460 of a neighbouring diffuser tile 410. The compartment portion 460 formed on diffuser tiles 411, 412 formed at external edges and corners of the diffuser element 400 have outwardly facing surfaces 461.

In some embodiments (in particular where the diffuser element 400 extend in front of the housing 100), the outwardly facing surfaces 461 of the compartment portion 460 of the diffuser tiles 411, 412 formed at external edges of the diffuser element 400 comprises, are angled relative to the outwardly facing sidewalls 441 of the diffuser tiles 410. Thereby, it is achieved that light emitted from the light emitting elements 210 is also directed towards the side walls 441 of the diffuser tiles 411. In preferred embodiments, the angle between the side walls 441 of the diffuser tiles 411 and the corresponding outwardly facing surface is acute.

As may be appreciated from FIGS. 6*a* and 6C, the compartment portion 460 of the diffuser tiles 410, 411 formed at external corners of the diffuser element 400 may comprises a first surface 465 formed between outwardly facing side surfaces 461 at the external corners of the diffuser element 400. The first surface 465 interconnects the two outwardly facing side surfaces 461 of the compartment portion 460.

A first surfaces 465 directs light emitted from the light emitting elements 210 and through the diffuser tile 410 and towards the corresponding corner of the diffuser element 400. Preferably the first surface 465 forms an angel of 45° relative to the two adjacent outwardly facing side surfaces 461.

In some embodiments the diffuser tiles 410 of the diffuser element 400 may be formed as separate pieces and connected to form the diffuser element 400, by for example the diffuser grid 500, or other (not shown) connecter elements.

However, in preferred embodiments, and as shown in e.g. FIGS. 6A, 6C, and 6I), the diffuser element 400 comprising diffuser tiles 410 and the diffuser grid 500 is formed as one integrated unit. In some embodiments, this may be achieved by the diffuser tiles 410 of the diffuser element 400 being interconnected by tile connecting elements 450 formed integrally with and in the same material as the diffuser tiles 410.

Thereby, it is made possible, that the diffuser grid 500 may be formed in the spaces between the diffuser tiles 410 as the second stage of a two stage moulding process (two component moulding process), where the diffuser tiles 410 with the connecter elements 450 are formed in the first stage of the two stage moulding process (two component moulding process). Alternatively, the diffuser grid 500 may be formed in a first stage of a two stage moulding process (two component moulding process), and the interconnected diffuser tiles 410 may be formed in the second stage.

In some embodiments, and as shown in e.g. FIGS. 6A, 6C, and 6D, the connecting elements 450 are protrusions extending from the lower surface 430 of the diffuser tiles 410, at corners of the diffuser tiles 410, where four neighbouring diffuser tiles 410 meet.

FIG. 6A, in a perspective view, shows a diffuser element 400 for a modular construction system light matrix according to an embodiment of the disclosure, and viewed from an inner/internal/bottom side thereof, the diffuser element having nine diffuser tiles 410 formed in a regular two-dimensional array. In this case, the diffuser element 400 have four connecting elements 450, that connects the nines diffuser tiles 410. Two of the four connecting elements 450 are solid, and the other two of the four connecting elements 450 have a circular holes 451 in the center forming inlet points for injection moulding the diffuser grid 500 in the second shot-stage of a two component injection moulding process. The connecting elements 450 enables that the diffuser element 400 can be moulded with two inlets instead of nine inlets, which is very beneficial on such small injection moulded plastic parts.

Above it was mentioned, that is some embodiments the internal surfaces of the compartments 330 of the compartment grid 300 may be covered by internal walls 150. Now this will be explained in further detail with reference to FIGS. 4, 5 and 8A-F.

First, it is noted that these internal walls 150 may be formed in a material different from the material used for compartment grid 300.

Preferably, the internal walls 150 are formed in a light reflecting material.

In either case, in an embodiment, the internal walls 150 may be made from the same material as the housing 100, or at least as the sidewalls 110 of the housing 100.

In some embodiments (not shown), the internal walls 150, the housing 100 (or at least as the sidewalls 110 of the housing 100) and the compartment grid 300 may be formed as separate, individual parts and be assembled subsequently.

In other embodiments (not shown), internal walls 150 may be provided as a layer made on the compartment grid 300 after the formation thereof, for example by coating the internal sides of the compartment grid 300 using a suitable material.

However, in preferred embodiments, the internal walls ISO are formed integral with the housing 100. For example, at least the sidewalls 110 of the housing 100 may be formed together with the internal walls 150 in a second injection moulding stage of a two stage moulding process (two component moulding process), where a compartment grid 300 formed in the first injection moulding stage of a two stage moulding process (two component moulding process) is used as a core in the second injection moulding stage.

Figure 8A:
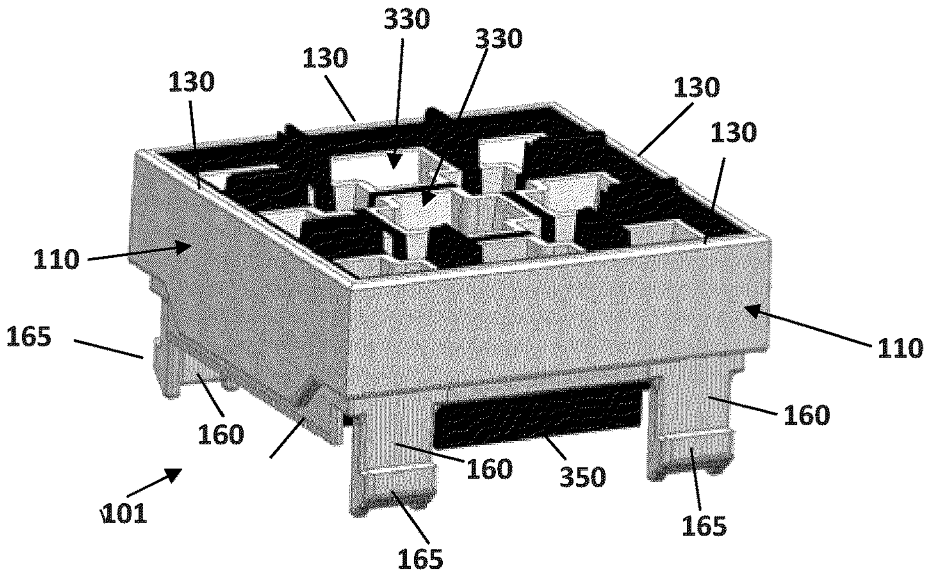
FIG. 8A, in a perspective view, shows a top housing part of a modular construction system light matrix viewed from the side and above, the top housing part having a compartment grid arranged therein.
Figure 8B:
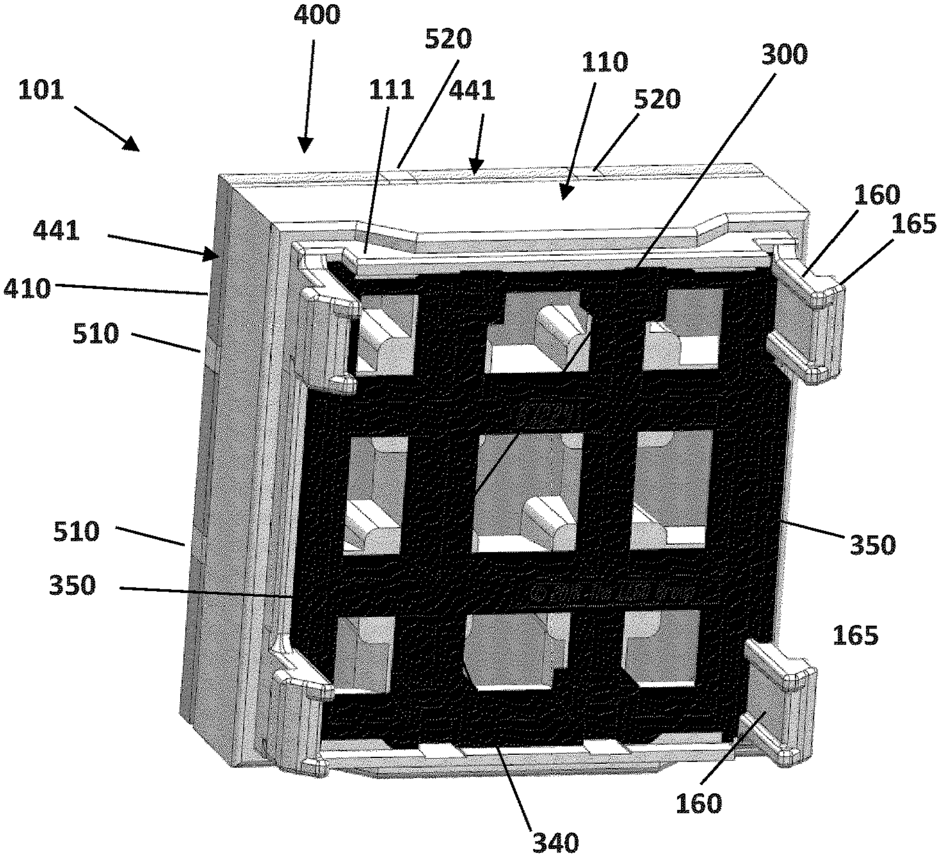
FIG. 8B, in a perspective view, shows the top housing part of FIG. 8A from the side and showing a bottom side configured for facing the bottom housing part.
Figure 8C:
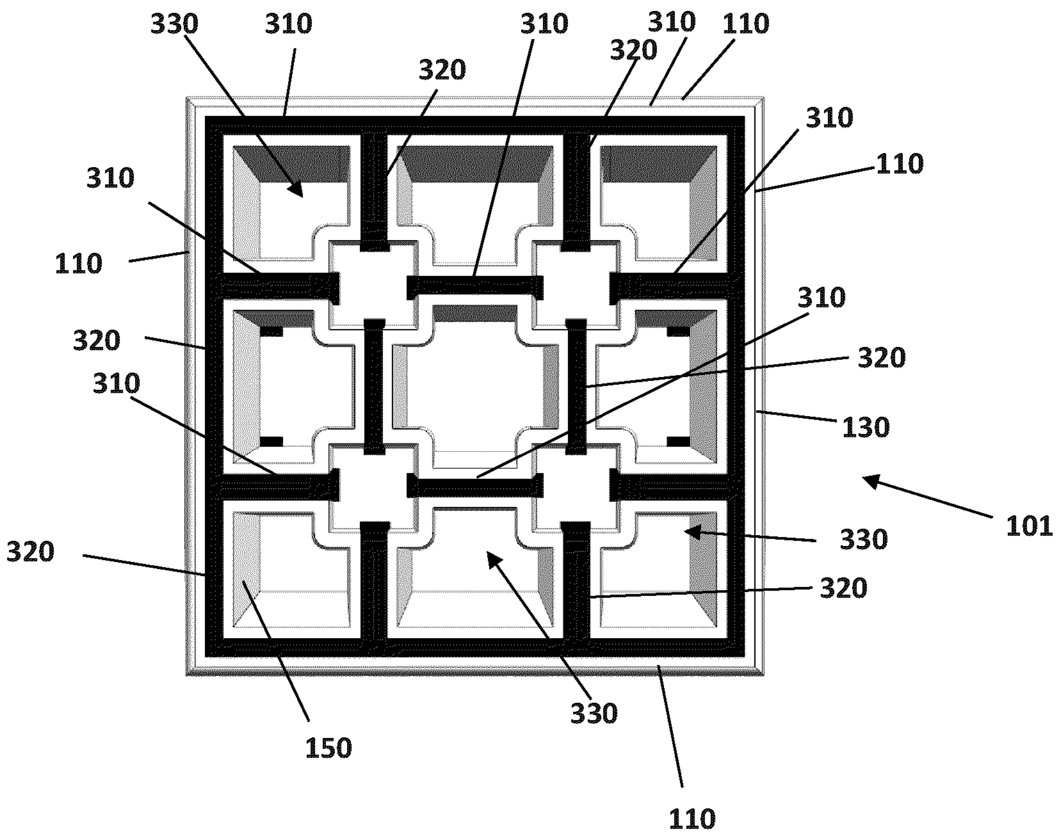
FIG. 8C, in a top view, shows the top housing pan of FIG. 8A from above.
Figure 8D:
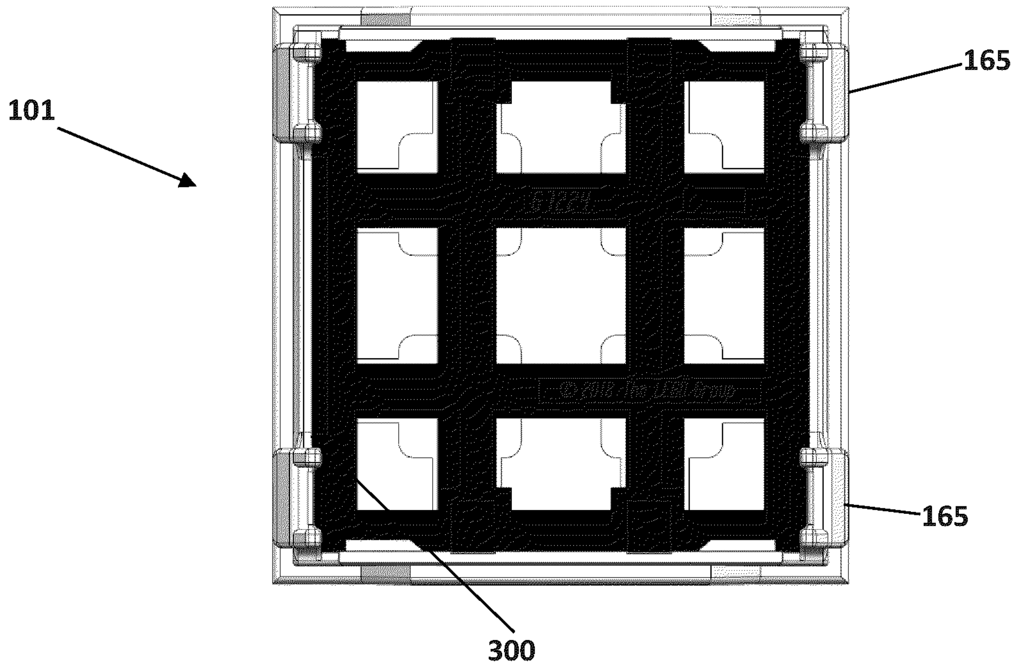
FIG. 8D, in a bottom view, shows the top housing part of FIG. 8A from below.

As shown in FIGS. 4, 5 and 8C, at least some of the internal walls 150 and/or the inwardly facing surfaces of the compartments 330 may be configured such that they taper outwards in a direction from the light emitting elements 210 at the bottom of the compartments 330 and towards the diffuser element 400 at the front edge 130 of the housing 100.

FIGS. 4 and 5 show an upper part of the housing 100, with the upper housing part 101 of the housing and the arrangement of the compartment grid 300 and the PCB 250 (with the light emitting elements 210) relative thereto. However, portions of the lower housing part 102 is also visible in both FIGS. 4 and 5. As shown most clearly in FIG. 5, the upper housing part 101 may comprise a slightly recessed (relative to the outer surface of the side wall 110 of the upper housing part 101), downwardly extending flange 111 configured for cooperating with a flange 112 upwardly extending from the lower housing part 102.

As may be best appreciated from FIGS. 8A, B, E, and F, the upper hosing part 101 may further comprise downwardly extending flexible/resilient legs 160. In the shown embodiment, the upper hosing part 101 comprises four legs 160. A barb 165 is provided on each leg 160. An opening 170 is formed in and through a sidewall 110 of the lower housing part 102, which opening 170 is configured for receiving the barb 165 of a corresponding leg 160 extending downward from upper housing part 101. The barb receiving opening 170 is shown in e.g. FIG. 2A. The resilience of the leg 160 ensures that the barb 165 may snap into the barb receiving opening 170. By pressing the barb 165 inwardly, the upper housing part 101 and the lower housing part 102 may be released from each other again.

Figure 7B:
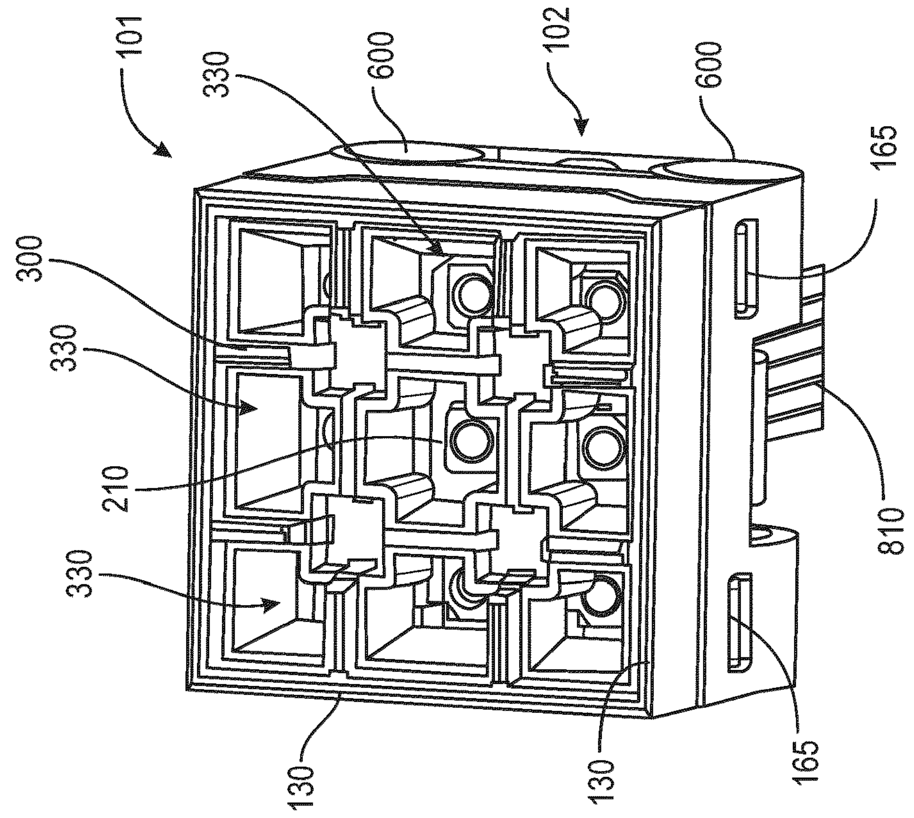
FIG. 7B, in a perspective view, shows a top housing part of a modular construction system light matrix mounted on the bottom housing part of FIG. 7A.
Figure 7A:
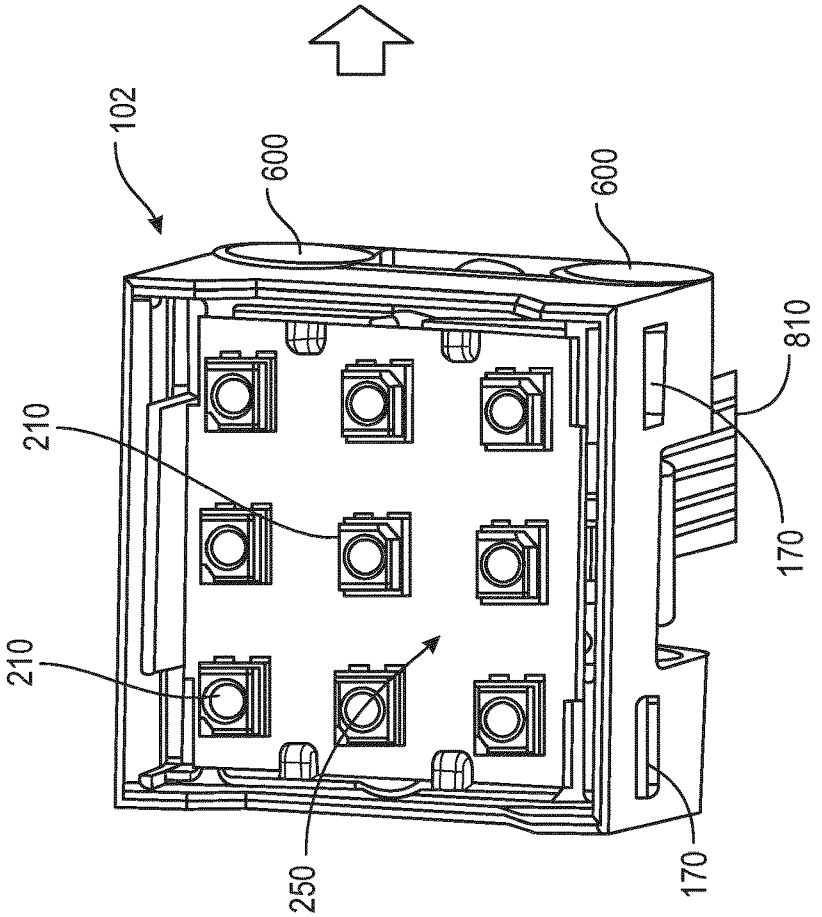
FIG. 7A, in a perspective view, shows a bottom housing part of a modular construction system light matrix according to an embodiment of the disclosure, with an array of LEDs.

FIG. 7A, in a perspective view, shows a bottom housing part of a modular construction system light matrix according to an embodiment of the disclosure, with an array of LEDs.

FIG. 7B, in a perspective view, shows a top housing part of a modular construction system light matrix mounted on the bottom housing part of FIG. 7A.

Together, FIGS. 7A and 7B illustrates steps of the assembly of a light matrix according to the disclosure.

First in FIG. 7A the electronic components of the light matrix 1 are assembled in the lower housing part 102. The cable unit 800 is connected to the PCB 250 with the light emitting elements 210. The PCB 250 with the light emitting elements 210 is arranged in the lower housing part 201 with the light emitting elements 210 facing upwards.

Then the upper housing part 101 is connected to the lower housing part 102 to form the assembled housing 100 of the light matrix 1, as shown in FIG. 7B.

Preferably, but not shown in FIGS. 7A and 7B, the diffuser element 400 is also mounted to the top/upper housing part 101 before connecting the upper housing part 101 to the lower housing part 102.

The diffuser element 400 may be first ultra-sonic welded onto the top/upper housing part 101. Then, the combined diffuser element 400 and top/upper housing part 101 may then be snapped onto the bottom/lower housing part 102.

The top/upper housing part 101 could also be called "light reflector housing".

FIG. 8A, in a perspective view, shows a top housing part of a modular construction system light matrix viewed from above, the top housing part having a compartment grid arranged therein. FIG. 8B, in a perspective view, shows the top housing part of FIG. 8A from below.

Figure 8E:
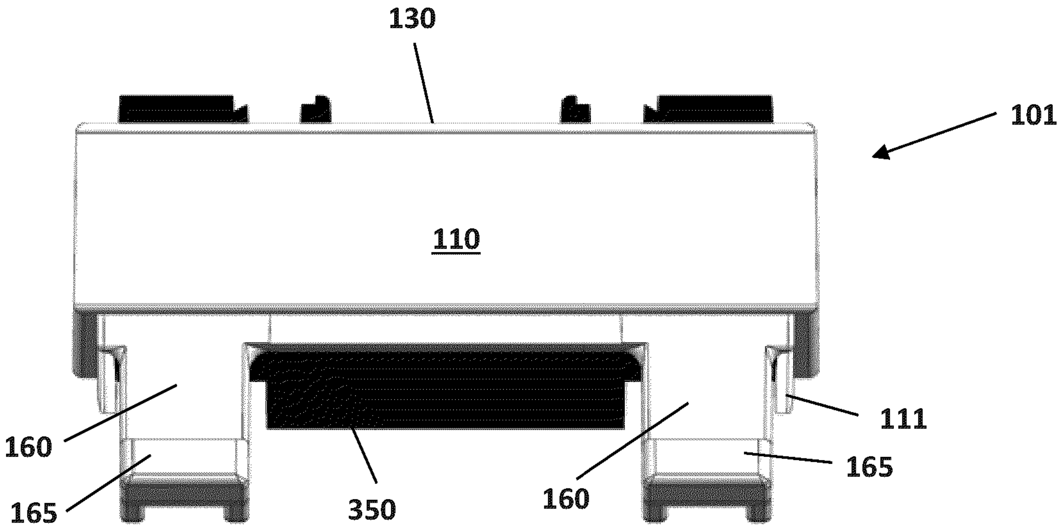
FIG. 8E, in a perspective view, shows the top housing part of FIG. 8A from a side and slightly below.
Figure 8F:
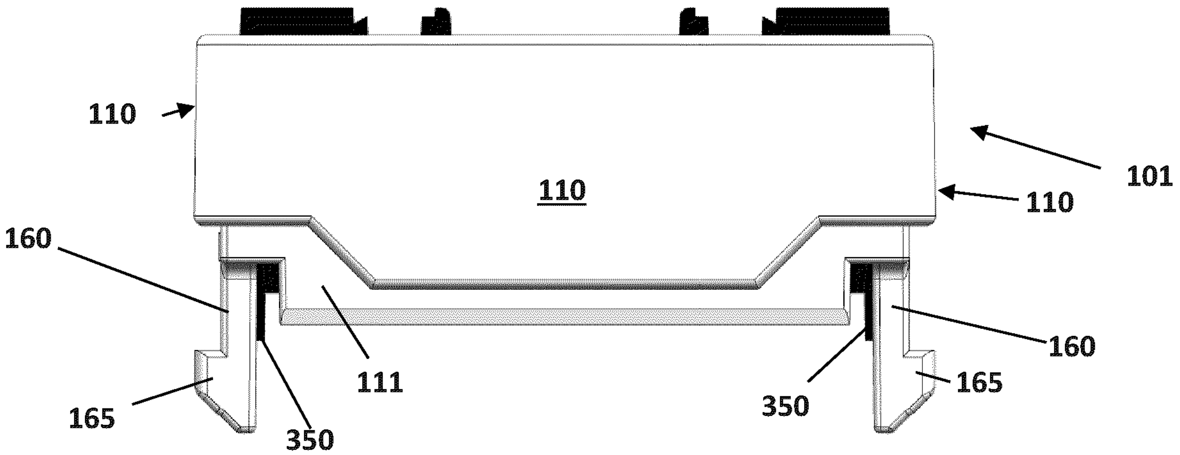
FIG. 8F, in a side view, shows the top housing part of FIG. 8A.

As illustrated in FIGS. 8B, 8E and 8F, the compartment grid 300 may comprise one or more flanges 350 extending downward from the compartment grid 300 arranged along side(s) of the compartment grid 300. The purpose of the one or more flanges 350 is to prevent light bleeding sideways from the compartments 330 at the level of the PCB and light bleeding downwards and through the sidewalls of the lower housing part 102.

In FIGS. 8B, 8E and 8F, the compartment grid 300 comprise two flanges 350 arranged along opposite sides of the compartment grid 300.

The bottom 340 of compartment grid 300 is in black color. This is chosen, so there would be black plastic and a black KCBA around the LEDs, which provides for limited light bleeding/optimizing the light containment.

Figure 9A:
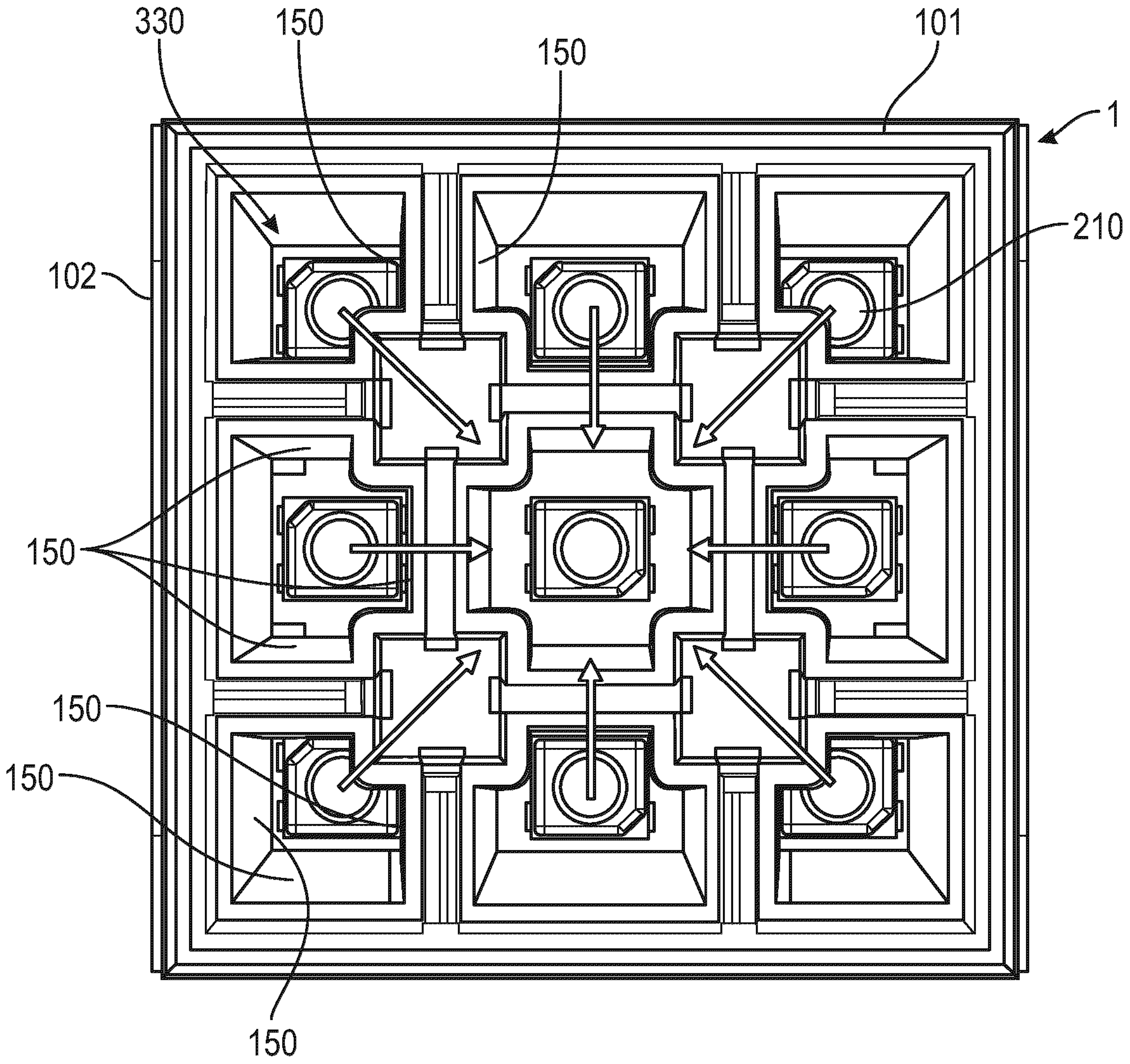
FIG. 9A, shows the modular construction system light matrix with the diffuser element removed, and illustrates light pattern in the light matrix.
Figure 9B:
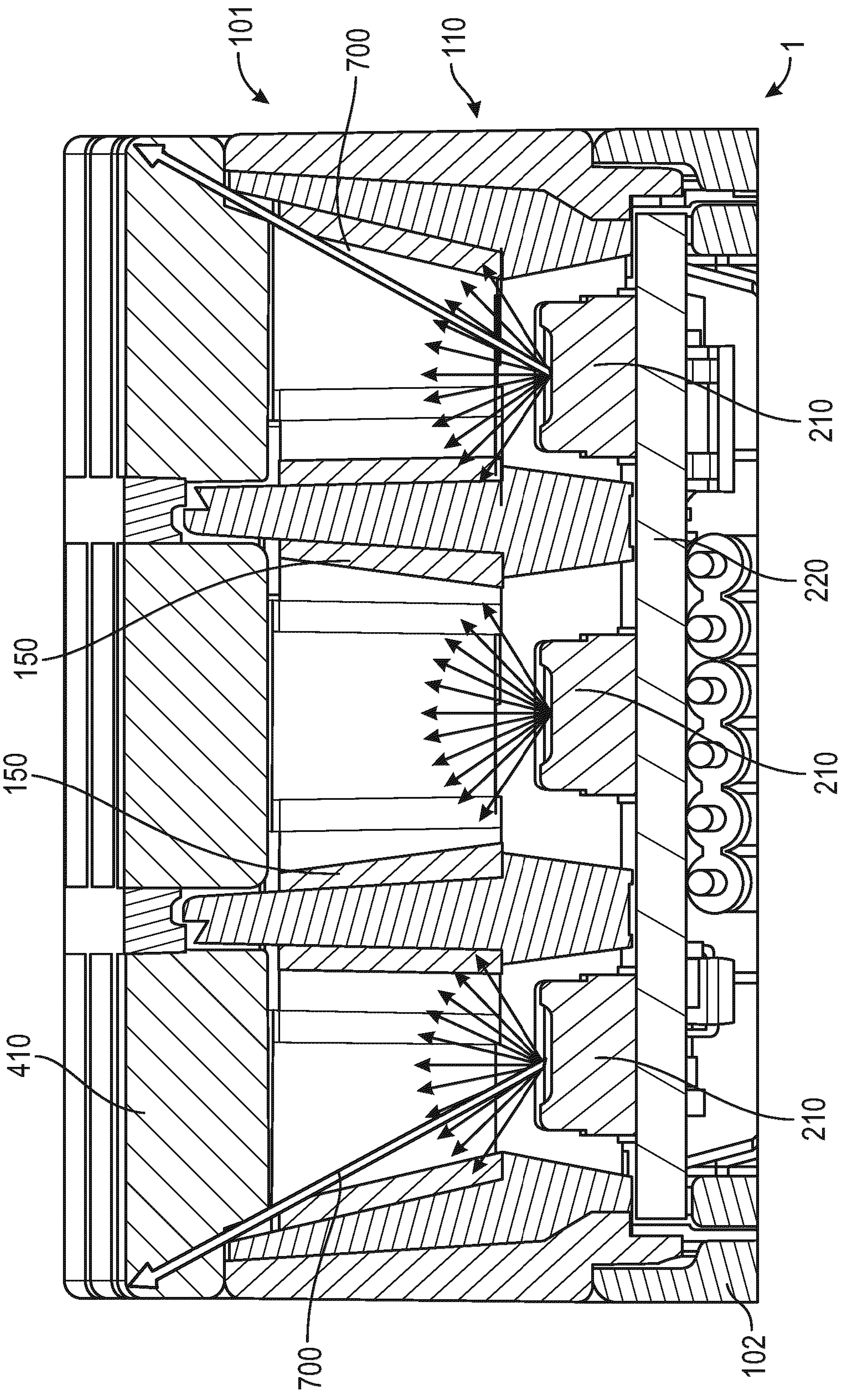
FIG. 9B, in a sectional perspective view parallel to a side of the light matrix, shows the top housing part including a diffuser element, and illustrates light patterns in the light matrix.
Figure 9C:
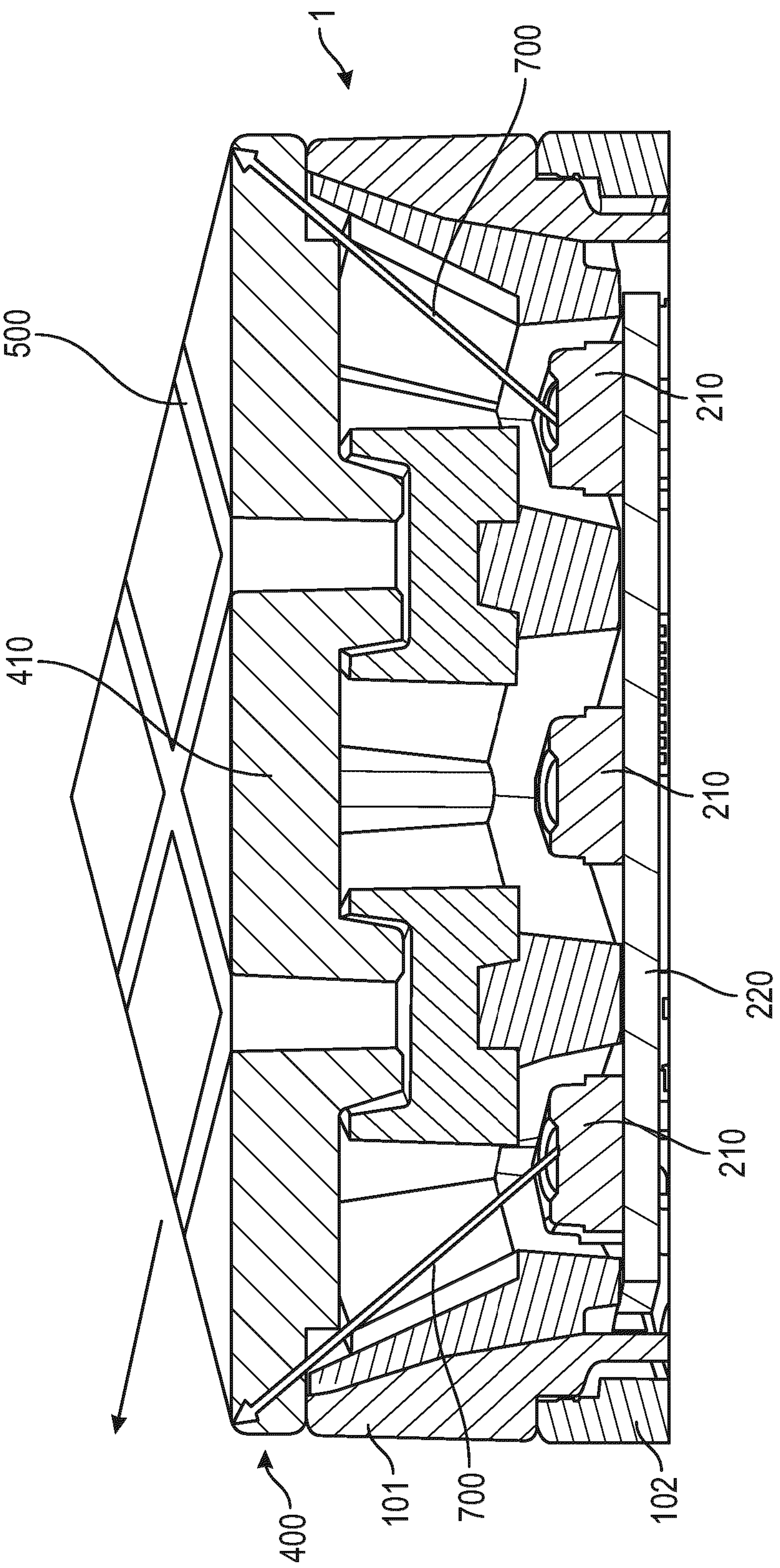
FIG. 9C, in a sectional perspective view diagonally from corner to corner of the light matrix, shows the top housing part including a diffuser, and illustrates light patterns in the light matrix.

FIG. 9A, shows the modular construction system light matrix with the diffuser element removed, and illustrates light pattern in the light matrix. FIG. 9B, in a sectional perspective view parallel to a side of the light matrix, shows the top housing part including a diffuser element, and illustrates light patterns in the light matrix; and FIG. 9C, in a sectional perspective view diagonally from corner to corner of the light matrix, shows the top housing part including a diffuser, and illustrates light patterns in the light matrix.

The placement of the light emitting elements 210 have an impact on the light output. The light emitting elements 210 are moved as much as possible towards the center of the PCB 250 (illustrated by arrows in FIG. 9A).

The construction of the light reflecting internal walls 150 makes the limitation. With the optimized position, the center of the light emitting elements 210 have direct line towards the edge of the diffuser element 400. This way as much as possible of the emitted light with direction towards the edge of the diffuser elements enters the diffuser element (see arrows 700 in FIGS. 9B and C).

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific injection moulding procedure have not been described in detail since it is maintained that the person skilled in the art would be able to find suitable materials and suitable processes to manufacture the container according to the current disclosure.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

LIST OF PARTS

1 light matrix/modular construction system light matrix
100 housing of light matrix
101 upper housing part
102 lower housing part
110 side wall of housing
111 downwardly extending flange of upper housing part
112 upwardly extending flange of lower housing part
120 end wall of housing
130 front edge of housing
140 front opening of housing
150 internal walls
160 leg extending downward from upper housing part
165 barb on leg extending downward from upper housing part
170 opening in lower housing part, configured for receiving barb of leg extending downward from upper housing part
200 array/array of light emitting elements
210 light emitting element such as light emitting diode (LED)
250 printed circuit board (PCB)
300 compartment grid,
310 first compartment grid wall of compartment grid
320 second compartment grid wall of compartment grid
330 compartment formed between grid walls of the compartment grid
350 flange extending downward from compartment grid
400 light diffusing element/diffuser element
410 diffuser tile
411 diffuser tile at corners of light diffusing element/diffuser element
412 diffuser tile at edges of light diffusing element/diffuser element
413 diffuser tile at internal array positions of the light diffusing element
415 main body part of the diffuser tiles
420 front surface of the diffuser tile
430 back/rear surface of the diffuser tile
440 sidewall of the diffuser tile, formed perpendicularly to the front surface of the of diffuser tile
441 outwardly facing sidewalls of the diffuser tile
442 sidewall of the diffuser tile facing a sidewall of another diffuser tile

450 tile connecting element, element connecting diffuser tiles of the diffuser element
460 compartment portion of a diffuser tile
461 outwardly facing surfaces of the compartment portion of diffuser tiles formed at external edges and corners of the diffuser element
462 side surfaces of the compartment portion facing towards compartment portion of a neighbouring diffuser tile
465 first surface formed between outwardly facing side surfaces at the external corners of the diffuser element
470 downwardly facing edge
500 diffuser grid/grid of the diffuser element
510 first diffuser grid wall of diffuser grid
520 second diffuser grid wall of diffuser grid
600 modular connector, such as a connector hole
800 cable unit 800
810 electrical cables 810
820 connector plug configured for connecting the light matrix with an external device
900 prior art art light matrix
910 lower housing part of prior art art light matrix
920 LED array 920 of prior art art light matrix
925 LID of prior art art light matrix
930 grid of prior art art light matrix
940 plate of prior art art light matrix
950 upper housing part of prior art art light matrix
960 upper frame of prior art art light matrix
970 diffuser plate of prior art art light matrix
980 compartments of prior art art light matrix

What is claimed is:

1. A modular construction system light matrix comprising:
- a housing having side walls, an end wall and a front edge encircling a front opening of said housing opposite to said end wall;
- an array of light emitting elements arranged on a printed circuit board, the printed circuit board being arranged in said housing;
- a compartment grid arranged in said housing, and having compartment grid walls extending from said printed circuit board towards said front opening of the housing, and forming an array of compartments, one compartment for each light emitting element; and
- a light diffusing element arranged at said opening of the housing,
- wherein the diffusing element comprises a plurality of diffuser tiles, each diffuser tile for covering a compartment of the compartment grid,
- wherein each diffuser tile has a front surface, a back surface and sidewalls formed perpendicularly to the front surface,
- wherein the diffusing element comprises a diffuser grid providing a barrier between mutually facing sidewalls of the diffuser tiles,
- wherein the diffuser grid is formed in a material different from a material of the diffuser tiles, and
- wherein a lower side of the diffuser grid is adapted to abut against an upper side of the compartment grid, to prevent light bleeding between the array of compartments.

2. The modular construction system light matrix according to claim 1, wherein the compartment grid is formed in a light absorbing material.

3. The modular construction system light matrix according to claim 1, wherein the diffuser grid is formed in a light absorbing material.

4. The modular construction system light matrix according to claim 1, wherein the diffuser grid is formed in a light reflecting material.

5. The modular construction system light matrix according to claim 4, wherein the diffuser grid is formed in the same material as the side walls of the housing.

6. The modular construction system light matrix according to claim 1, wherein outwardly facing sidewalls of the diffuser tiles extend in front of said front edge and forms an extension of the sidewalls of the housing and flush therewith.

7. The modular construction system light matrix according to claim 1, wherein each diffuser tile comprises a compartment portion extending into a compartment provided by the compartment grid.

8. The modular construction system light matrix according to claim 7, wherein outwardly facing surfaces of the compartment portion of the diffuser tiles formed at external edges of the diffusing element are angled relative to the outwardly facing sidewalls of the diffuser tiles.

9. The modular construction system light matrix according to claim 7, wherein the compartment portion of the diffuser tiles formed at external corners of the diffusing element comprises a first surface formed between outwardly facing side surfaces at the external corners of the diffusing element, the first surface interconnecting the two outwardly facing side surfaces of the compartment portion.

10. The modular construction system light matrix according to claim 1, wherein the diffuser tiles are interconnected by a tile connecting element formed integrally with and in the same material as the diffuser tiles.

11. The modular construction system light matrix according to claim 1, wherein internal surfaces of the compartments of the compartment grid are covered by internal walls formed in a material different from the material of the compartment grid.

12. The modular construction system light matrix according to claim 11, wherein the internal walls are formed in a light reflecting material.

13. The modular construction system light matrix according to claim 11, wherein the internal walls are formed integral with the housing.

14. The modular construction system light matrix according to claim 11, wherein the internal walls taper outwards towards the diffusing element.

15. The modular construction system light matrix according to claim 1, wherein the diffusing element comprising the diffuser grid and the diffuser tiles are formed integrally as a unit, mountable on the housing.

16. The modular construction system light matrix according to claim 1, wherein the housing comprises connector openings complementary with connector pegs of a modular construction system.

17. A modular construction system light matrix comprising:
- a housing having side walls, an end wall and a front edge encircling a front opening of said housing opposite to said end wall;
- an array of light emitting elements arranged on a printed circuit board, the printed circuit board being arranged in said housing;
- a compartment grid arranged in said housing, and having compartment grid walls extending from said printed circuit board towards said front opening of the housing, and forming an array of compartments, one compartment for each light emitting element; and a light diffusing element arranged at said opening of the housing, wherein outwardly facing sidewalls of the light diffusing element extend in front of said front edge and forms an extension of the sidewalls of the housing and flush therewith, and wherein a lower side of the light diffusing element is abuts against an upper side of the compartment grid, to prevent light bleeding between the array of compartments.

18. The modular construction system light matrix according to claim 17, wherein the light diffusing element comprises a plurality of diffuser tiles, each diffuser tile covering a compartment of the compartment grid, wherein each diffuser tile has a front surface, a back surface and sidewalls formed perpendicularly to the front surface, wherein the light diffusing element comprises a diffuser grid providing a barrier between mutually facing sidewalls of the diffuser tiles, and wherein the diffuser grid is formed in a material different from a material of the diffuser tiles.

19. A modular construction system light matrix comprising:

an upper and lower housing each having upstanding walls, the upper and lower housing configured for assembly together;

an array disposed within the housing, the array including a plurality of light emitting elements;

a compartment grid arranged in the housing between the array and the upper housing, the compartment grid forming an array of compartments, one compartment for each light emitting elements; and a light diffusing element arranged on an outer surface of the upper housing, opposite the lower housing, the light diffusing element having a plurality of diffuser tiles each for covering a compartment of the compartment grid such that the light diffusing element defines a grid corresponding to the compartment grid, wherein a lower side of the light diffusing element abuts against an upper side of the compartment grid, to prevent light bleeding between the array of compartments.

* * * * *